(12) United States Patent
Toomey et al.

(10) Patent No.: US 8,572,227 B2
(45) Date of Patent: Oct. 29, 2013

(54) METHODS AND APPARATUSES FOR COMMUNICATING PRESERVATION NOTICES AND SURVEYS

(75) Inventors: Brian L. Toomey, Charlotte, NC (US); John N. Whalen, Jr., Cornelius, NC (US); Eric B. Hobart, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 12/618,443

(22) Filed: Nov. 13, 2009

(65) Prior Publication Data

US 2010/0250644 A1 Sep. 30, 2010

Related U.S. Application Data

(60) Provisional application No. 61/164,276, filed on Mar. 27, 2009.

(51) Int. Cl.
*G06F 15/173* (2006.01)

(52) U.S. Cl.
USPC ........... 709/223; 709/203; 709/206; 705/311; 715/742

(58) Field of Classification Search
USPC ........... 709/203, 206, 223; 705/311; 715/742; 434/362
See application file for complete search history.

(56) References Cited

U.S. PATENT DOCUMENTS

| | | | |
|---|---|---|---|
| 6,119,137 A | 9/2000 | Smith et al. | |
| 6,601,108 B1 | 7/2003 | Marmor | |
| 6,658,625 B1 | 12/2003 | Allen | |
| 6,941,361 B1 | 9/2005 | Fink et al. | |
| 7,076,543 B1 | 7/2006 | Kirti et al. | |
| 7,124,249 B1 | 10/2006 | Darcy | |
| 7,134,020 B2 | 11/2006 | Eagle et al. | |

(Continued)

FOREIGN PATENT DOCUMENTS

| | | |
|---|---|---|
| EP | 1093068 A2 | 4/2001 |
| EP | 1349089 A2 | 1/2003 |

(Continued)

OTHER PUBLICATIONS

J. Barlow, L. Bean and D.D. Hott: "Employee 'Spy' Software: Should You Use It?" The Journal of Corporate Accounting & Finance, Document No. XP-002601405, pp. 7-12; Retrieved from the Internet: URL: http://onlinelibrary.wiley.com/10.1002/icaf.10162/abstract [retrieved on Sep. 17, 2010].

(Continued)

*Primary Examiner* — Oanh Duong
(74) *Attorney, Agent, or Firm* — Michael A. Springs; Moore & Van Allen, PLLC; Nicholas C. Russell

(57) ABSTRACT

In general, embodiments of the present invention relate to methods and apparatuses for managing electronic discovery, and more particularly, for communicating a preservation notice and/or a survey to and/or from a custodian in an enterprise. For example, in some embodiments, a method for electronic discovery management is provided, where the method includes: (1) creating an electronic discovery matter; (2) adding a custodian to the electronic discovery matter; (3) creating a preservation notice and/or a survey; and (4) communicating, via a network, information associated with the preservation notice and/or the survey to the custodian at a data storage device accessible to the custodian.

42 Claims, 11 Drawing Sheets

(56) References Cited

U.S. PATENT DOCUMENTS

| | | | |
|---|---|---|---|
| 7,376,969 | B1 | 5/2008 | Njemanze et al. |
| 7,451,103 | B1 | 11/2008 | Boyle et al. |
| 7,451,139 | B2 | 11/2008 | Namba |
| 7,571,110 | B2 * | 8/2009 | Tarr et al. ............... 705/7.32 |
| 7,765,181 | B2 * | 7/2010 | Thomas et al. ........... 709/221 |
| 7,895,229 | B1 * | 2/2011 | Paknad .................... 707/769 |
| 8,073,729 | B2 * | 12/2011 | Kisin et al. ............... 705/7.35 |
| 2002/0194097 | A1 | 12/2002 | Reitz |
| 2002/0198629 | A1 | 12/2002 | Ellis |
| 2003/0154199 | A1 * | 8/2003 | Thomas et al. ............ 707/10 |
| 2003/0182375 | A1 | 9/2003 | Zhu et al. |
| 2003/0200308 | A1 | 10/2003 | Tameda et al. |
| 2004/0098424 | A1 | 5/2004 | Seidenberg et al. |
| 2004/0260733 | A1 | 12/2004 | Adelstein et al. |
| 2005/0086720 | A1 | 4/2005 | Shimizu et al. |
| 2005/0152235 | A1 | 7/2005 | Hoshizawa |
| 2005/0177527 | A1 | 8/2005 | Morris et al. |
| 2006/0095795 | A1 | 5/2006 | Nakamura et al. |
| 2006/0167877 | A1 | 7/2006 | Lee et al. |
| 2006/0256739 | A1 | 11/2006 | Seier et al. |
| 2007/0027974 | A1 | 2/2007 | Lee et al. |
| 2007/0073894 | A1 | 3/2007 | Erickson et al. |
| 2007/0088754 | A1 | 4/2007 | Brannon et al. |
| 2007/0112783 | A1 | 5/2007 | McCreight et al. |
| 2007/0162547 | A1 | 7/2007 | Ross |
| 2007/0208918 | A1 | 9/2007 | Harbin et al. |
| 2007/0226170 | A1 | 9/2007 | Sun |
| 2007/0271517 | A1 * | 11/2007 | Finkelman et al. ........... 715/742 |
| 2007/0288579 | A1 | 12/2007 | Schunemann |
| 2008/0027895 | A1 | 1/2008 | Combaz |
| 2008/0046260 | A1 | 2/2008 | Ghielmetti et al. |
| 2008/0061146 | A1 | 3/2008 | Komaki |
| 2008/0082672 | A1 | 4/2008 | Garrett |
| 2008/0168145 | A1 | 7/2008 | Wilson |
| 2008/0252936 | A1 | 10/2008 | Stratton |
| 2008/0288479 | A1 * | 11/2008 | Paknad et al. ............... 707/4 |
| 2008/0294492 | A1 | 11/2008 | Simpson et al. |
| 2009/0001162 | A1 | 1/2009 | Asher et al. |
| 2009/0006973 | A1 | 1/2009 | Newell et al. |
| 2009/0043819 | A1 * | 2/2009 | Searl et al. ............... 707/104.1 |
| 2009/0132262 | A1 * | 5/2009 | Paknad .................... 705/1 |
| 2009/0164522 | A1 | 6/2009 | Fahey |
| 2009/0165026 | A1 | 6/2009 | Paknad et al. |
| 2009/0183253 | A1 | 7/2009 | Kates |
| 2009/0286219 | A1 * | 11/2009 | Kisin et al. ............... 434/362 |
| 2010/0017239 | A1 | 1/2010 | Saltzman et al. |
| 2010/0033750 | A1 | 2/2010 | Tischler et al. |
| 2010/0082382 | A1 | 4/2010 | Kisin et al. |
| 2010/0082555 | A1 * | 4/2010 | Ogawa et al. ............... 707/688 |
| 2010/0205020 | A1 * | 8/2010 | Losey ..................... 705/7 |
| 2010/0223108 | A1 | 9/2010 | Quinn, Jr. |
| 2010/0308111 | A1 * | 12/2010 | Scharf et al. .............. 235/385 |
| 2011/0040600 | A1 * | 2/2011 | Paknad et al. ............... 705/9 |
| 2011/0173033 | A1 * | 7/2011 | Paknad et al. ............... 705/7.11 |

FOREIGN PATENT DOCUMENTS

| | | | |
|---|---|---|---|
| WO | 01/27765 | A1 | 4/2001 |
| WO | 0210967 | A2 | 2/2002 |
| WO | 02071192 | A2 | 9/2002 |
| WO | 03/065256 | A1 | 8/2003 |
| WO | 2004092902 | A2 | 10/2004 |
| WO | 2006001833 | A2 | 1/2006 |
| WO | 2006031836 | A2 | 3/2006 |
| WO | WO 2006/031836 | A2 | 3/2006 |
| WO | 2006052441 | A2 | 5/2006 |
| WO | 2007/044709 | A2 | 4/2007 |
| WO | 2007076515 | A2 | 7/2007 |
| WO | WO 2007/076515 | | 7/2007 |
| WO | 2008009991 | A1 | 1/2008 |
| WO | 2008070415 | A2 | 6/2008 |
| WO | WO 2008/070415 | A2 | 6/2008 |

OTHER PUBLICATIONS

Dan Manson et al.: "Is the Open Way a Better Way? Digital Forensics using Open Source Tools", Proceedings of the 40th Hawaii International Conference on System Sciences—2007 [dated Jan. 1, 2007]; 10 pages total.

Anonymous: "EDRM LegalTech 2009 Luncheon Presentation", E.D.R.M.—The Electronic Discovery Reference Model; Document No. XP-002601404 LegalTech Lunch & Learn, Feb. 3, 2009, LegalTech New York; Retrieved from the Internet; URL:http//edrm. net/002/wp-content/uploads/2006/09/EDRM_LegalTech.pdf [retrieved Sep. 17, 2010].

Extended European Search Report dated Sep. 22, 2010 for European Application No. EP 10 25 0578.

U.S. Appl. No. 12/534,375, filed Aug. 3, 2009.
U.S. Appl. No. 12/614,059, filed Nov. 6, 2009.
U.S. Appl. No. 12/618,430, filed Nov. 13, 2009.
U.S. Appl. No. 12/627,791, filed Nov. 30, 2009.
U.S. Appl. No. 12/627,890, filed Nov. 30, 2009.
U.S. Appl. No. 12/627,996, filed Nov. 30, 2009.
U.S. Appl. No. 12/696,653, filed Jan. 29, 2010.
U.S. Appl. No. 12/702,641, filed Feb. 9, 2010.
U.S. Appl. No. 12/729,987, filed Mar. 23, 2010.
U.S. Appl. No. 12/730,780, filed Mar. 24, 2010.
U.S. Appl. No. 12/730,785, filed Mar. 24, 2010.
U.S. Appl. No. 12/730,790, filed Mar. 24, 2010.
U.S. Appl. No. 12/730,792, filed Mar. 24, 2010.
U.S. Appl. No. 12/730,799, filed Mar. 24, 2010.
U.S. Appl. No. 12/730,807, filed Mar. 24, 2010.
U.S. Appl. No. 12/730,818, filed Mar. 24, 2010.
U.S. Appl. No. 12/730,821, filed Mar. 24, 2010.
U.S. Appl. No. 12/730,840, filed Mar. 24, 2010.
U.S. Appl. No. 12/730,848, filed Mar. 24, 2010.
U.S. Appl. No. 12/730,851, filed Mar. 24, 2010.
U.S. Appl. No. 12/731,657, filed Mar. 25, 2010.

Singapore Patent Application No. 201002142-6 Search Report and Written Opinion mailed Sep. 5, 2011.
Singapore Patent Application No. 201002144-2 Search Report and Written Opinion mailed Sep. 5, 2011.
Singapore Patent Application No. 201002140-0 Search Report and Written Opinion mailed Sep. 27, 2011.

Ciravegna et al.: "User-System Cooperation in Document Annotation based on Information Extraction" 2002. Proceedings of the 13th International Conference on Knowledge Engineering and Knowledge Management.

Buchholz et al.: "On the Role of File System Metadata in Digital Forensics", Journal of Digital Investigation, vol. 1(4), pp. 297-308, Dec. 1, 2004.

Golden et al. Scalpel: "A Frugal, High Performance File Carver" 2005 Digital Forensic Research Workshop (DFRWS) New Orleans, LA.

Manson et al.: "Is the Open Way a Better Way? Digital Forensics using Open Source Tools". System Sciences, 2007. HICSS 2007. 40th Annual Hawaii International Conference on, IEEE, PI, Jan. 1, 2007. ISBN:978-0-7695-2755-0.

Berinato: "The Rise of Anti-Forensics" http/www.csoonline.com/article/print/221208. Jun. 8, 2007.

Anonymous: "EDRM LegalTech 2009 Luncheon Presentation" E.D. R.M. The Electronic Discovery Reference Model Feb. 2, 2009. Retrieved from the Internet: http://www.edrm.net/wp-content/plugins/download-monitor/download.php?id=6.

Singapore Patent Application No. 201002126-9 Search Report and Written Opinion mailed Aug. 3, 2011.
Singapore Patent Application No. 201002129-3 Search Report and Written Opinion mailed Aug. 3, 2011.
Singapore Patent Application No. 201002128-5 Search Report and Written Opinion mailed Aug. 3, 2011.
Singapore Patent Application No. 201002139-2 Search Report and Written Opinion mailed Aug. 3, 2011.
Singapore Patent Application No. 201002137-6 Search Report and Written Opinion mailed Aug. 15, 2011.

(56) References Cited

OTHER PUBLICATIONS

Singapore Patent Application No. 201002138-4 Search Report and Written Opinion mailed Aug. 19, 2011.
Singapore Patent Application No. 201002125-1 Search Report and Written Opinion mailed Aug. 24, 2011.
Singapore Patent Application No. 201002134-3 Search Report and Written Opinion mailed Aug. 25, 2011.
Singapore Patent Application No. 201002124-4 Search Report and Written Opinion mailed Aug. 25, 2011.
European Patent Office. European Office Action dated Apr. 26, 2012. European Application No. 10 250 589.8. Name of Applicant: Bank of America Corporation. English Language. 10 pages.
European Patent Office. European Office Action dated Apr. 26, 2012. European Application No. 10 250 579.9. Name of Applicant: Bank of America Corporation. English Language. 10 pages.
European Patent Office. European Office Action dated Apr. 26, 2012. European Application No. 10 250 584.9. Name of Applicant: Bank of America Corporation. English Language. 10 pages.
European Patent Office. European Office Action dated Apr. 25, 2012. European Application No. 10 250 586.4. Name of Applicant: Bank of America Corporation. English Language. 10 pages.
European Patent Office. European Office Action dated Apr. 25, 2012. European Application No. 10 250 581.5. Name of Applicant: Bank of America Corporation. English Language. 10 pages.
European Patent Office. European Office Action dated Apr. 25, 2012. European Application No. 10 250 576.5. Name of Applicant: Bank of America Corporation. English Language. 11 pages.
European Patent Office. European Office Action dated Apr. 27, 2012. European Application No. 10 250 587.2. Name of Applicant: Bank of America Corporation. English Language. 10 pages.
European Patent Office. European Office Action dated Apr. 25, 2012. European Application No. 10 250 577.3. Name of Applicant: Bank of America Corporation. English Language. 10 pages.
European Patent Office. European Office Action dated Apr. 25, 2012. European Application No. 10 250 580.7. Name of Applicant: Bank of America Corporation. English Language. 10 pages.
European Patent Office. European Office Action dated Apr. 25, 2012. European Application No. 10 250 590.6. Name of Applicant: Bank of America Corporation. English Language. 10 pages.
European Patent Office. European Office Action dated Apr. 26, 2012. European Application No. 10 250 582.3. Name of Applicant: Bank of America Corporation. English Language. 10 pages.
Great Britain Intellectual Property Office. GB Examination Report dated Apr. 23, 2012. Great Britain Application No. GB1108090.0. Name of Applicant: Bank of America Corporation. English Language. 3 pages.
Hewlett Packard. "*HP OpenView Storage Data Protector Concepts Guide.*" Release A.06.00. Manufacturing Part No. B6960-96001. English Language. Jul. 2006.
Hungarian Intellectual Property Office. Written Opinion mailed Apr. 5, 2012. Hungary Application No. 201002137-6. Name of Applicant: Bank of America Corporation. English Language. 8 pages. Date of Written Opinion: Mar. 21, 2012.
Hungarian Intellectual Property Office. Written Opinion mailed Apr. 5, 2012. Hungary Application No. 201002138-4. Name of Applicant: Bank of America Corporation. English Language. 8 pages. Date of Written Opinion: Mar. 29, 2012.
SysTools Software, "Export Notes—Notes Email Migration Tool", 2008, available online: http://web.archive.org/web/20080201104418/http://www.exportlotusnotes.com/export-notes.
Process Text Group, "ABC Amber BlackBerry Converter", 2008, available online: http:web.archive.org/web/20080302025411/http://www.processtext.com/abcblackberry.html.
Search Report and Written Opinion for Singapore Application No. 201002122-8 mailed Jan. 3, 2012.
Search Report and Written Opinion for Singapore Application No. 201002141-8 mailed Jan. 3, 2012.
Search Report and Written Opinion for Singapore Application No. 201002143-4 mailed Jan. 3, 2012.
Search Report and Written Opinion for Singapore Application No. 201002120-2 mailed Feb. 10, 2012.
Second Written Opinion for Singapore Application No. 201002126-9 mailed Mar. 14, 2012.
Second Written Opinion for Singapore Application No. 201002128-5 mailed Mar. 14, 2012.
Second Written Opinion for Singapore Application No. 201002129-3 mailed Mar. 14, 2012.
Search Written Opinion for Singapore Application No. 201002139-2 mailed Mar. 14, 2012.
Danish Patent and Trademark Office. Singapore Examination Report mailed Mar. 15, 2012. Applicant: Bank of America Corporation. Singapore Patent Application No. 201002134-3. DKPTO SE No. SE 2012 00392v. English Language. 10 pages. Date of Examination Report: Mar. 12, 2012.
Danish Patent and Trademark Office. Singapore Examination Report mailed Mar. 15, 2012. Applicant: Bank of America Corporation. Singapore Patent Application No. 201002124-4. DKPTO SE No. SE 2012 00392y. English Language. 10 pages. Date of Examination Report: Mar. 12, 2012.
Singapore Written Opinion for Application No. 201002137-6 dated Mar. 21, 2012.
Second Written Opinion for Singapore Application No. 201002141-8 mailed Jul. 20, 2012.
Second Written Opinion for Singapore Application No. 201002120-2 mailed Jul. 20, 2012.
Second Written Opinion for Singapore Application No. 201002140-0 mailed Aug. 6, 2012.
Second Written Opinion for Singapore Application No. 201002144-2 mailed Aug. 6, 2012.
European Examination Report for Application No. 10250578.1 dated Apr. 25, 2012.
European Examination Report for Application No. 10250591.4 dated Apr. 25, 2012.
European Examination Report for Application No. 10250583.1 dated Apr. 26, 2012.
European Examination Report for Application No. 10250588.0 dated Jun. 27, 2012.

\* cited by examiner

METHODS AND APPARATUSES FOR COMMUNICATING PRESERVATION NOTICES AND SURVEYS

CLAIM OF PRIORITY UNDER 35 U.S.C. §119

The present application for patent claims priority to Provisional Application No. 61/164,276 entitled "Electronic Discovery System" filed Mar. 27, 2009, and assigned to the assignee hereof and hereby expressly incorporated by reference herein.

FIELD

In general, embodiments of the present invention relate to methods and apparatuses for managing electronic discovery, and more particularly, for communicating a preservation notice and/or a survey to and/or from a custodian in an enterprise.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, whereas paper documents must be scrutinized manually. Furthermore, digital data is difficult or impossible to completely destroy, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, identifying data required to satisfy a given discovery request, locating the appropriate set of data that has been identified, and retrieving the data once it has been identified and located all pose problems in and of themselves. This is especially evident if the data that is being identified, located and retrieved comes from an evolving or disparate enterprise, such as a corporation that has experienced mergers, acquisitions, downsizing and the like. Mergers and acquisitions mean that the technology infrastructure across the enterprise may vary, at least in the interim. However, e-discovery must be able locate and retrieve data from these disparate technology infrastructure in a timely fashion, sometimes within days of when the merger/acquisition occurs.

In addition to identifying, locating and retrieving digital data, the most critical part of any electronic discovery is the preservation of data, which involves maintaining an original source copy and storing it for preservation purposes or furthering processing. This too becomes a daunting task for the enterprise system that encompasses a myriad of different technology infrastructures and the like. Therefore, a need exists to improve the identification, location, retrieval and preservation processes, especially in instances in which the enterprise system includes disparate technology infrastructures and the like.

As previously noted, e-discovery, as opposed as conventional discovery of printed materials, provides for the ability to filter or search the data so as to reduce the volume of data to only that which is relevant to the request. Such searching is typically accomplished by determining a specific date range for the request, providing key words relevant to the case and the like. Improvements in the area of searching are greatly in need to further add efficiency to the overall e-discovery process.

Once data has been retrieved, preserved and, in some instances, searched the electronic data may be reviewed by the requesting entity, such as a law firm, securities commission or the like. While large requests are generally suited for online review, the manner in which the data is presented for review adds efficiency to the review process and ultimately drives the cost of the review process. Therefore, improvements in the manner in which data is presented for review are also desirable as a means of increasing efficiency and reducing costs.

Lastly, once the digital data has been reviewed, data identified as relevant may need to be produced in a tangible format for further analysis or legal evidentiary purposes. The produced documents must be properly identified and include necessary redactions and confidentiality markings.

Up until now, e-discovery management has been conducted on a case-by-case basis, meaning all tasking and workflow related to the e-discovery is based at the case level. Such management does not allow for finer granularity in the management of a case or for links to exist between different cases for the purpose of leveraging the e-discovery related to one case to another new or pre-existing case. Therefore, a need exists to improve the manner in which cases are managed and, in particular, how tasking and workflow are managed depending on case requirements and the like.

BRIEF SUMMARY OF SOME EMBODIMENTS OF THE PRESENT INVENTION

Embodiments of the present invention relate to methods and apparatuses for managing electronic discovery, and more particularly, for communicating a preservation notice and/or a survey to and/or from a custodian in an enterprise. For example, in some embodiments, a method for electronic discovery management is provided. In such embodiments, the method includes: (1) creating an electronic discovery matter; (2) adding a custodian to the electronic discovery matter; and (3) communicating, via a network, information associated with a preservation notice to the custodian at a data storage device accessible to the custodian.

In some embodiments of the method, communicating, via the network, information associated with the preservation notice further includes communicating, via the network, the preservation notice to the custodian at the data storage device. In some embodiments, the method further includes communicating, via the network, information associated with a survey to the custodian at the data storage device. In some embodiments of the method, communicating, via the network, information associated with the survey further includes communicating, via the network, the survey to the custodian at the data storage device. In still other embodiments, the method further includes creating the survey. Further, in some embodiments, the method further includes creating the preservation notice.

In some embodiments, the method further includes receiving, via the network, information associated with an acknowledgement from the custodian. In some embodiments, the method further includes receiving, via the network, information associated with a survey response from the custodian. In some embodiments, the method further includes communicating, via the network, information associated with a reminder notice to the custodian at the data storage device, and that information includes a reminder for the custodian to acknowledge the preservation notice.

In other embodiments of the method, the information associated with the preservation notice includes information associated with a status of one or more preservation notices or one or more surveys. In some embodiments, the information associated with the preservation notice includes a link to the preservation notice. In some embodiments of the method, the information associated with the preservation notice includes functionality (e.g., selectable button, fillable field, link, etc.) configured to permit the custodian to identify one or more other custodians to add to the electronic discovery matter or to receive the preservation notice.

In some embodiments, the method further includes linking the preservation notice to the custodian in the electronic discovery matter, and the linking the preservation notice to the custodian further includes automatically triggering communicating, via the network, the information associated with the preservation notice to the custodian at the data storage device. Similarly, in some embodiments, the method further includes linking the survey to the custodian in the electronic discovery matter, and the linking the survey to the custodian further includes automatically triggering communicating, via the network, the information associated with the survey to the custodian at the data storage device. In some embodiments, the method further includes communicating, via the network, the preservation notice to a holds portal accessible to the custodian.

As another example, in some embodiments of the present invention, an electronic discovery management system is provided. In such embodiments, the system includes a communication interface operatively connected to a network, and a processor operatively connected to the communication interface. Further, in such embodiments, the processor is configured to: (1) create an electronic discovery matter; (2) add a custodian to the electronic discovery matter; and (3) instruct the communication interface to communicate, via the network, information associated with a preservation notice to the custodian at a data storage device accessible to the custodian.

As still another example, in some embodiments of the present invention, a computer program product is provided. In such embodiments, the computer program product includes a computer-readable medium having computer-executable program code portions stored therein. Further, in such embodiments, the computer-executable program code portions include: (1) a first program code portion configured to create an electronic discovery matter; (2) a second program code portion configured to add a custodian to the electronic discovery matter; and (3) a third program code portion configured to communicate, via a network, information associated with a preservation notice to the custodian at a data storage device accessible to the custodian.

As a further example, in some embodiments of the present invention, a method of using an electronic discovery management system is provided. In such embodiments, the method includes: (1) establishing a network connection between the electronic discovery management system and a data storage device accessible to a custodian; (2) creating an electronic discovery matter; and (3) transmitting information associated with a survey from the electronic discovery management system to the custodian at the data storage device. In some embodiments, the method further includes communicating, via the network, the survey to a holds portal accessible to the custodian.

BRIEF DESCRIPTION OF THE DRAWINGS

Figure 1:
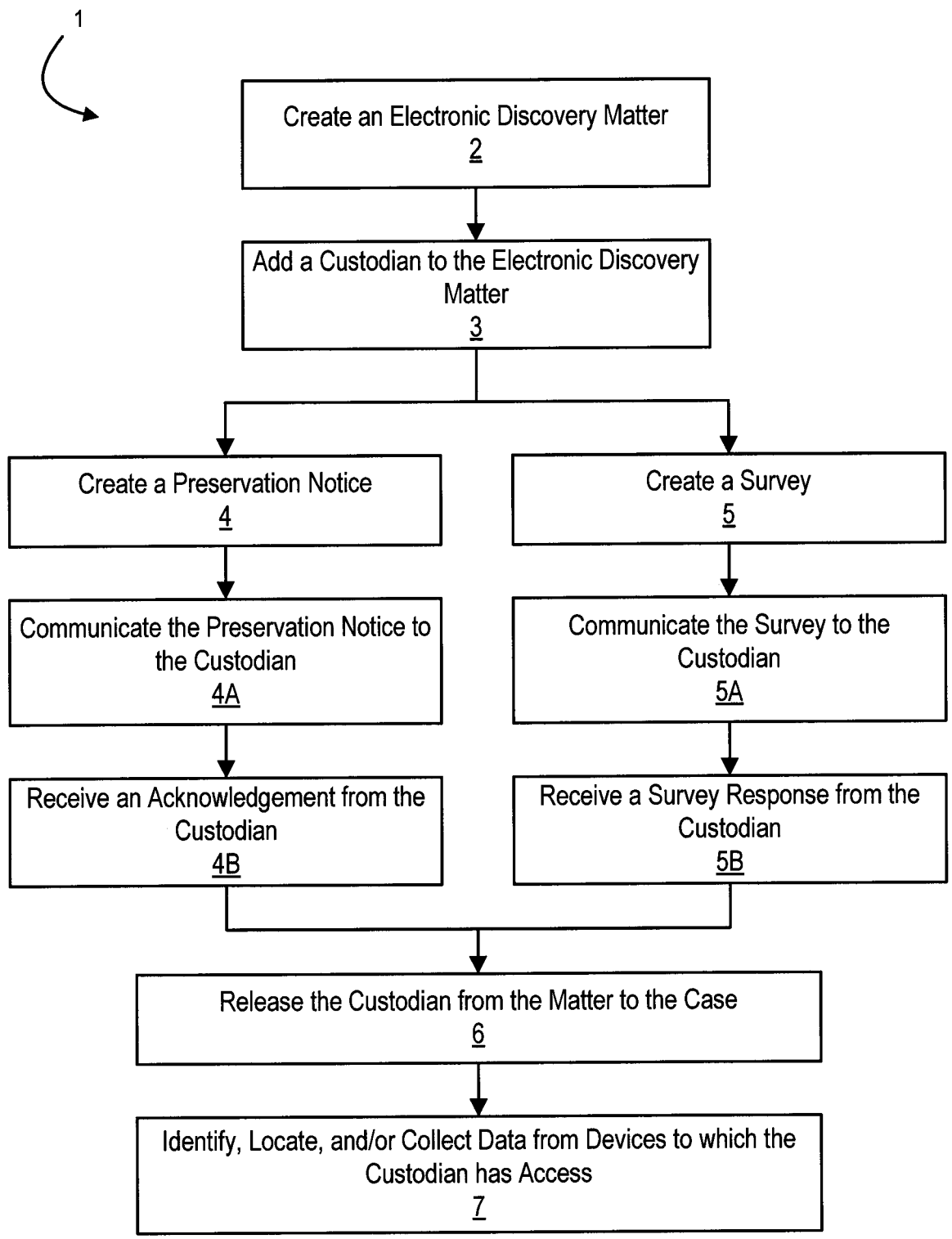
Figure 2:
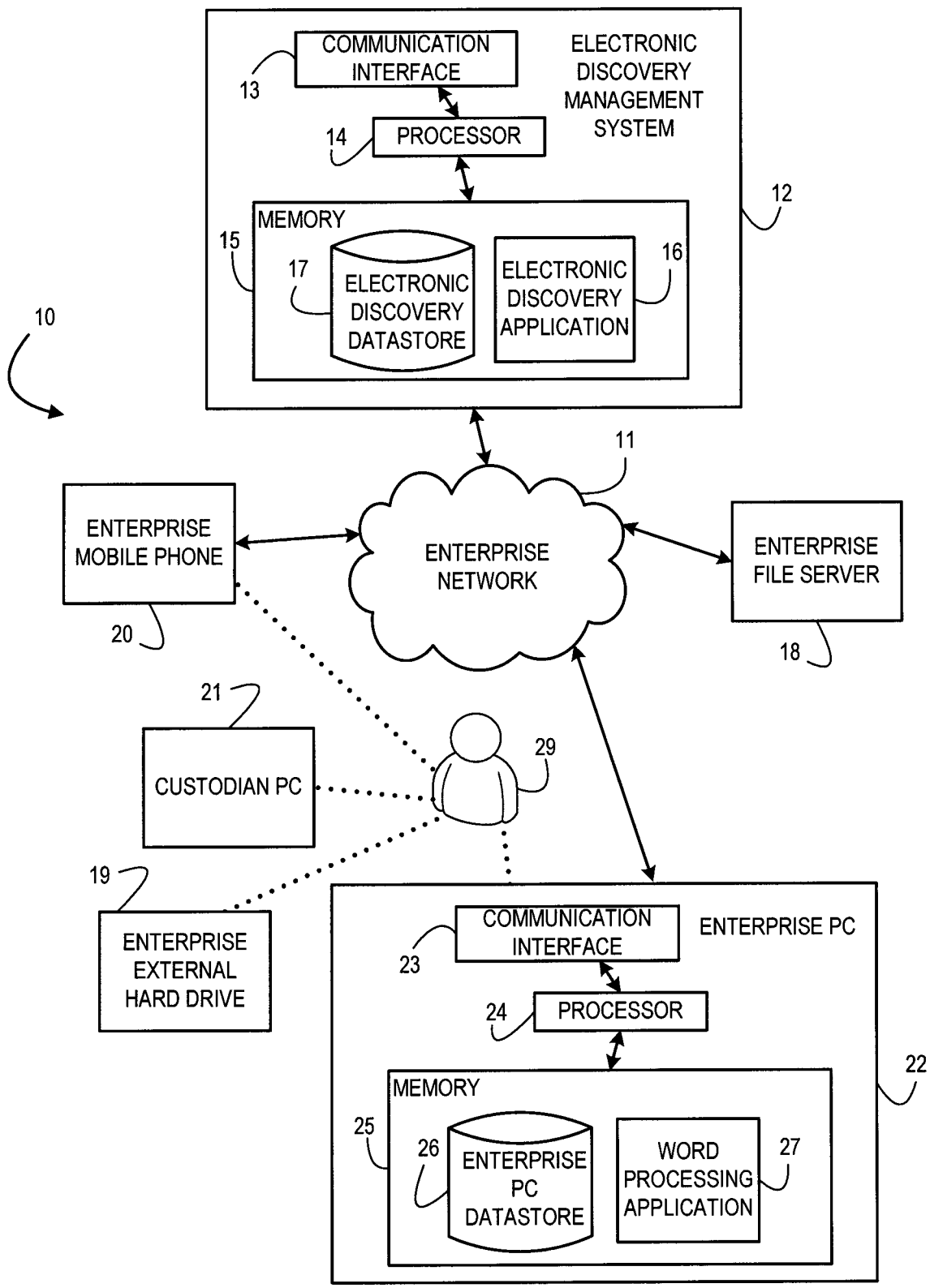
Figure 3:
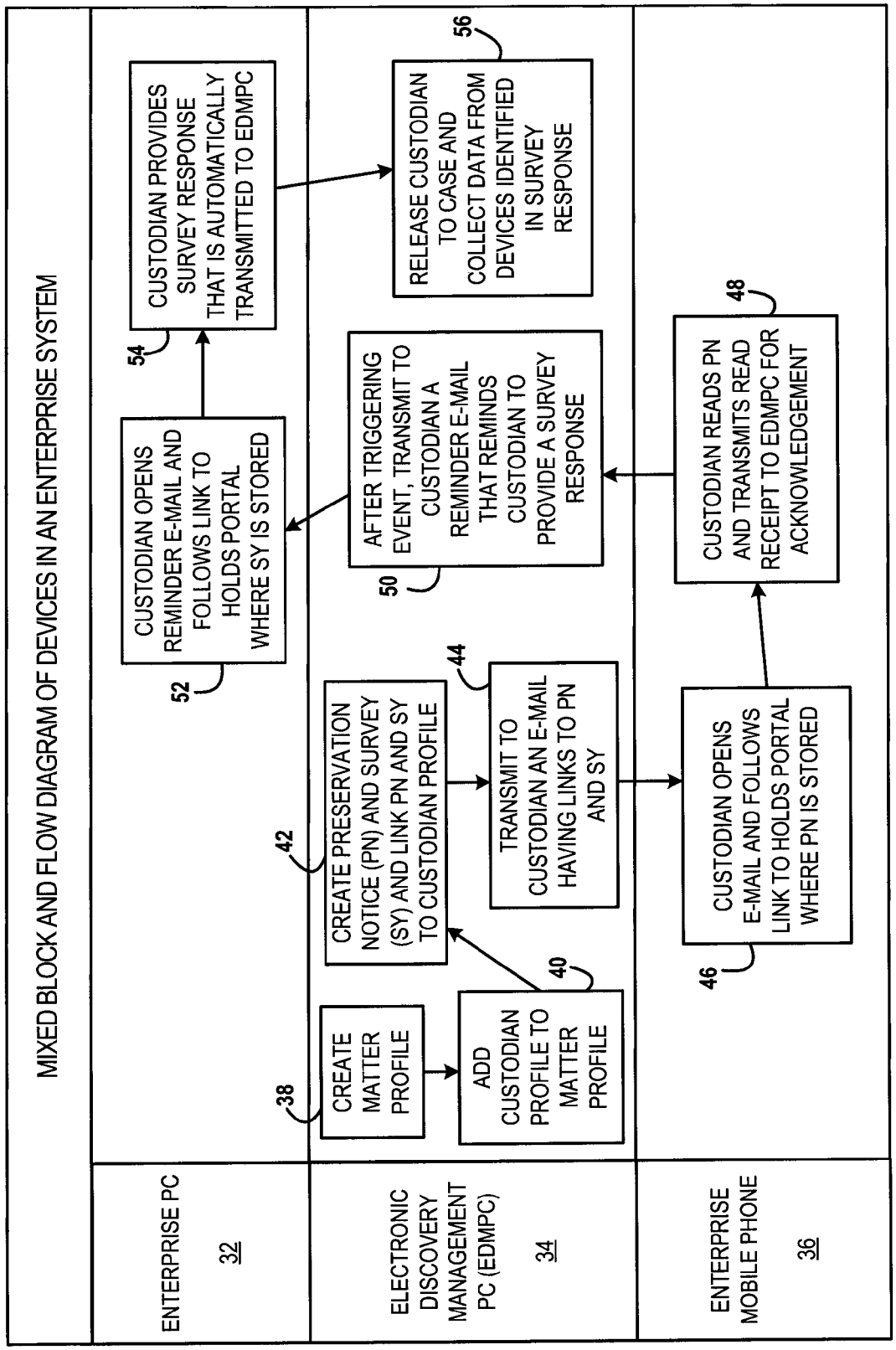
Figure 4:
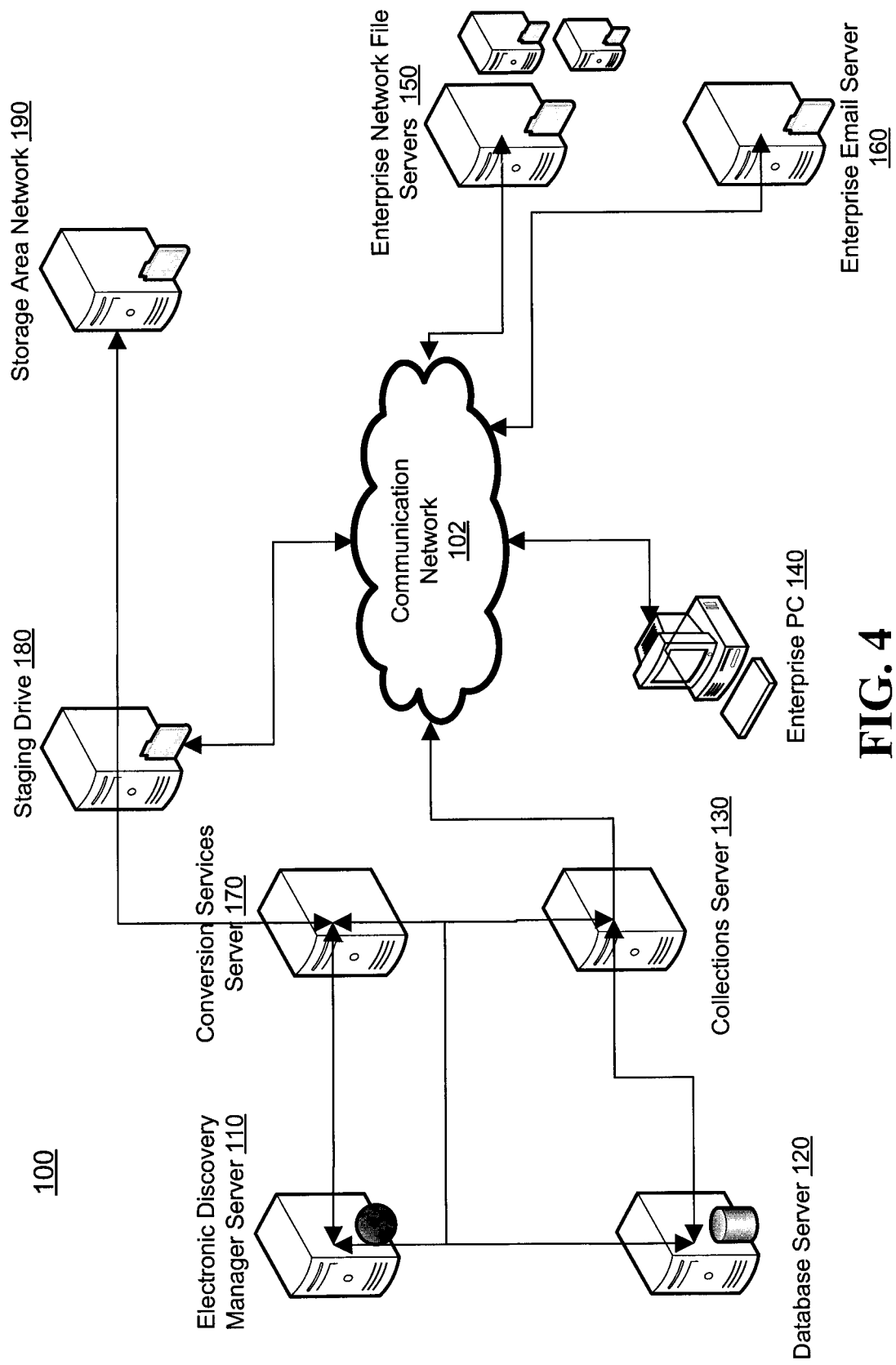
Figure 5:
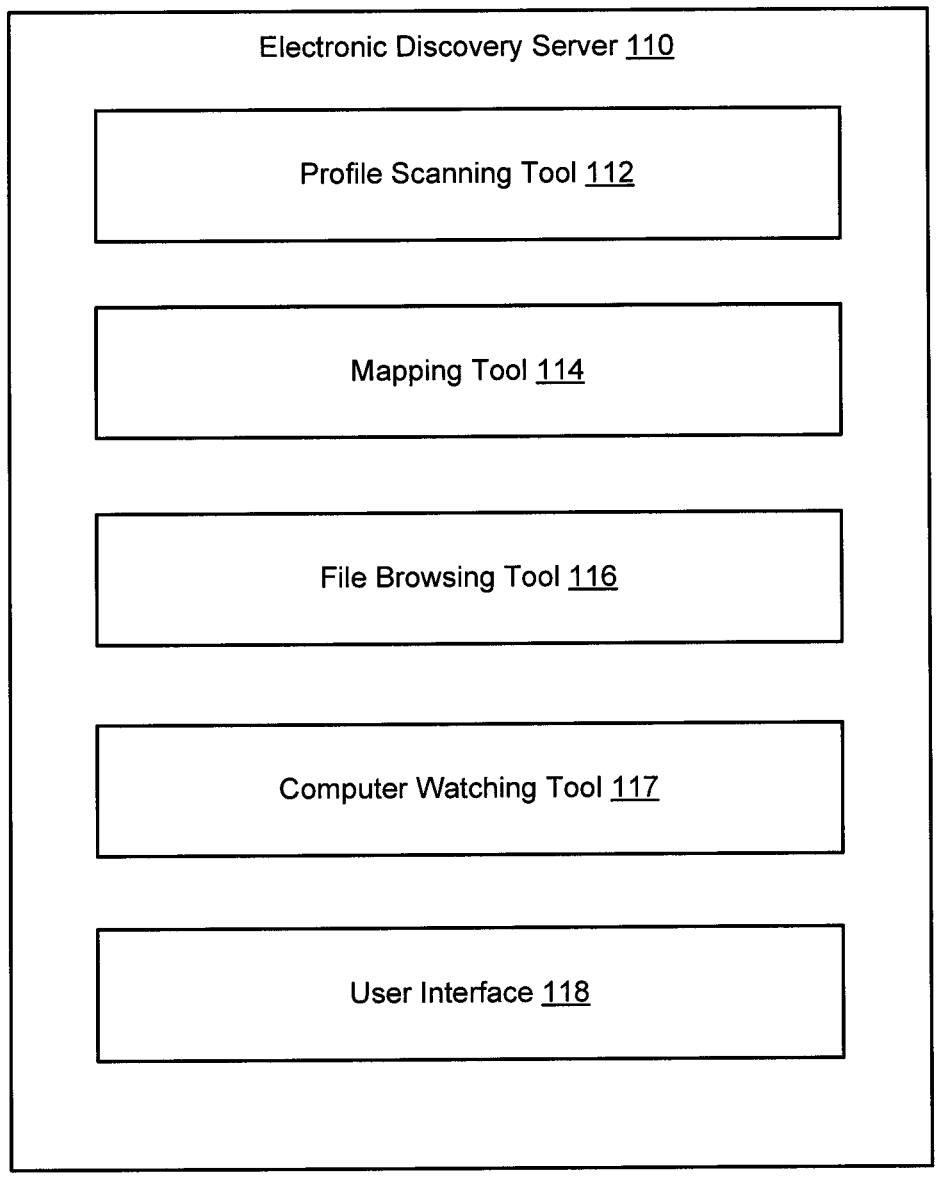
Figure 6:
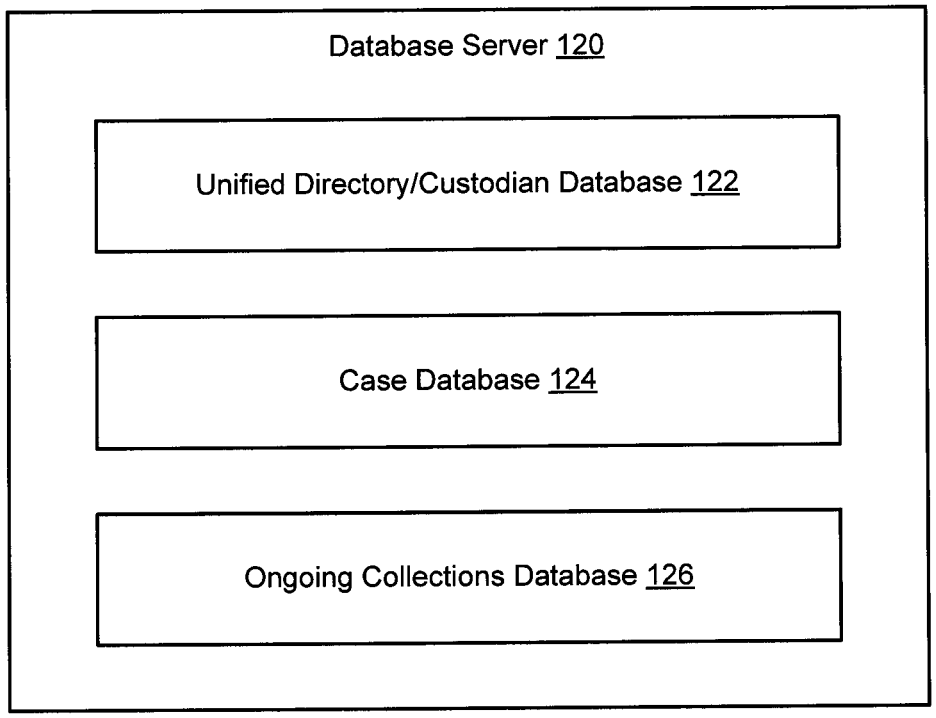
Figure 7:
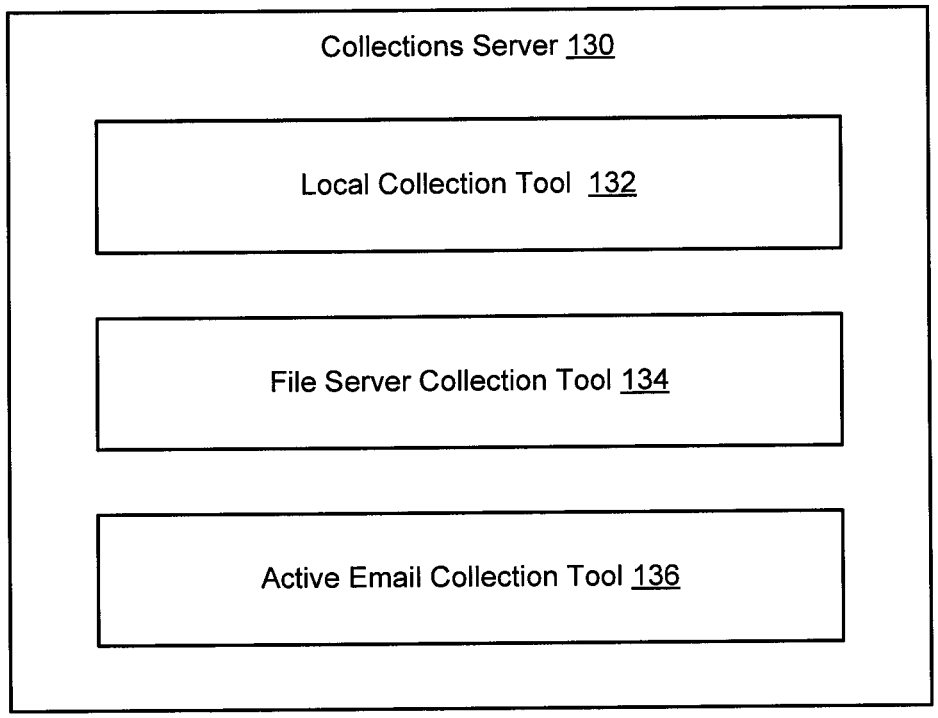
Figure 8:
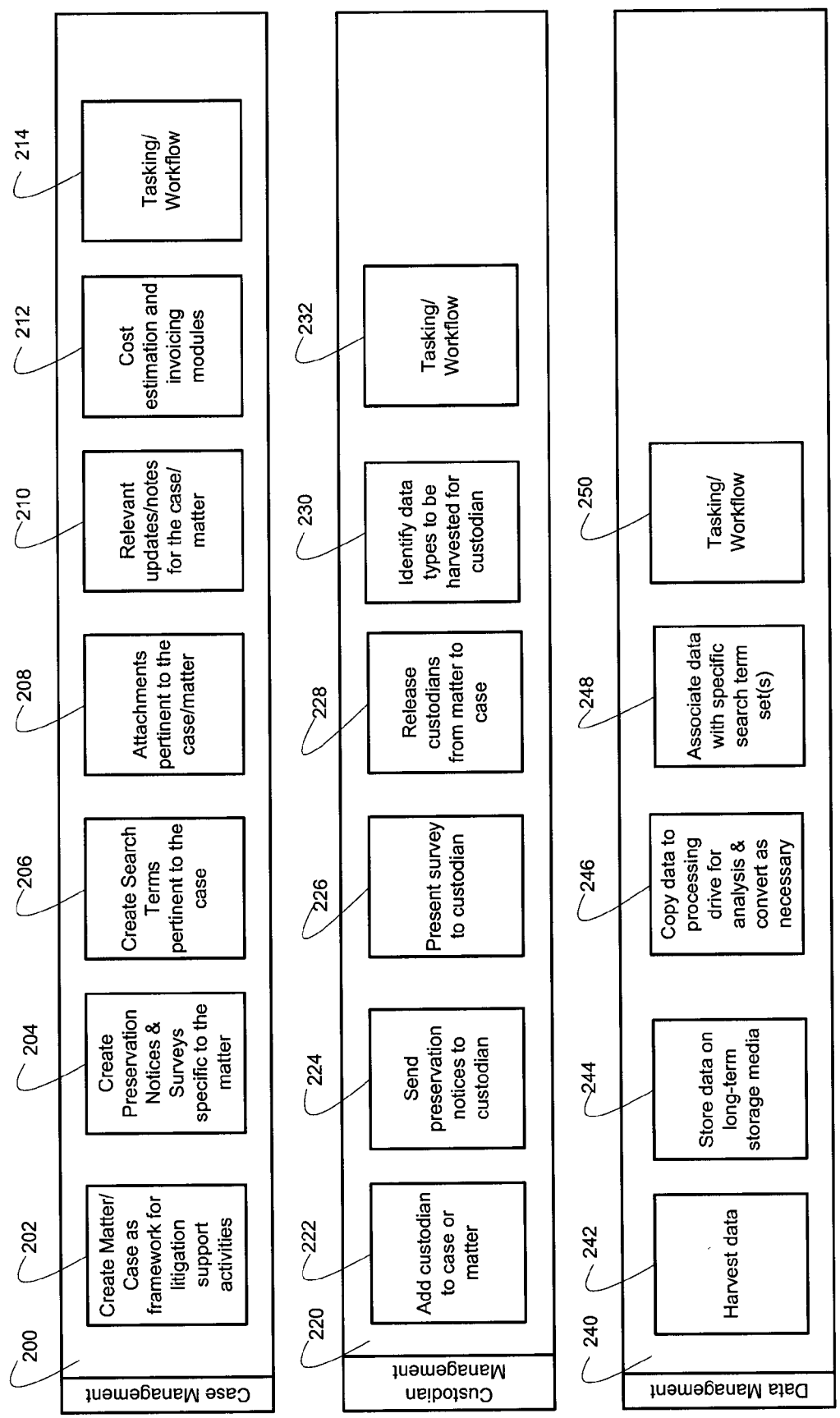
Figure 9:
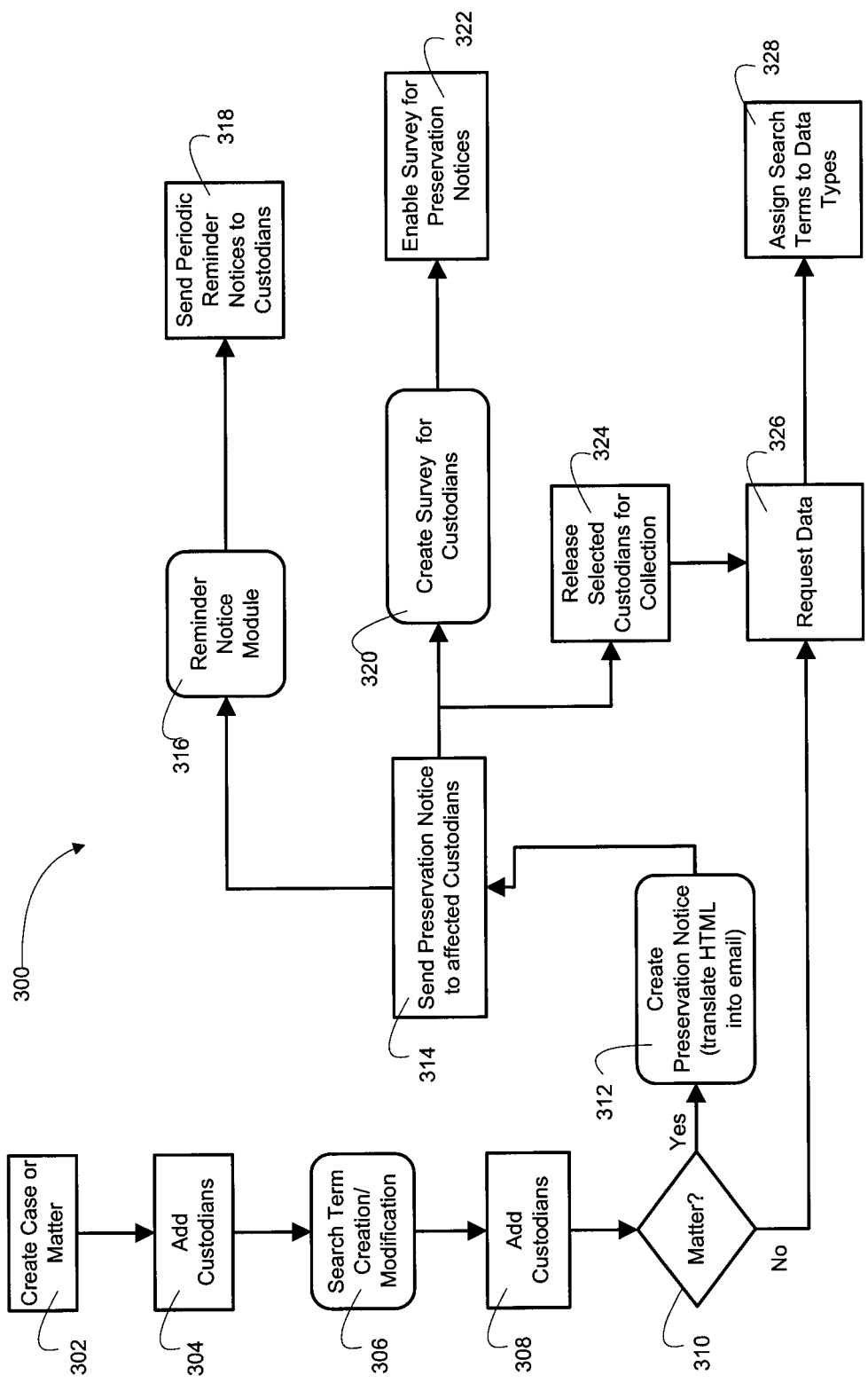
Figure 10:
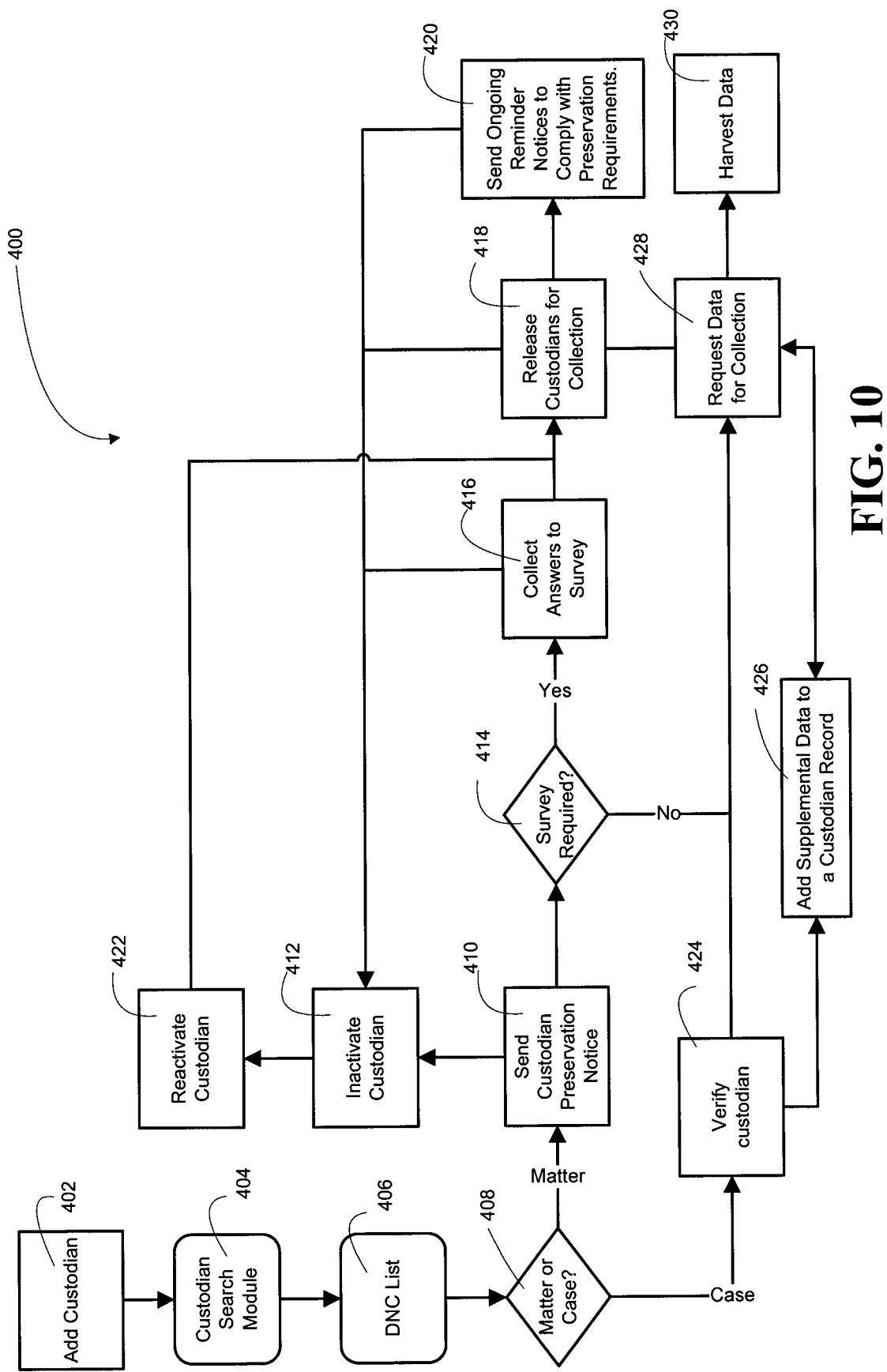
Figure 11:
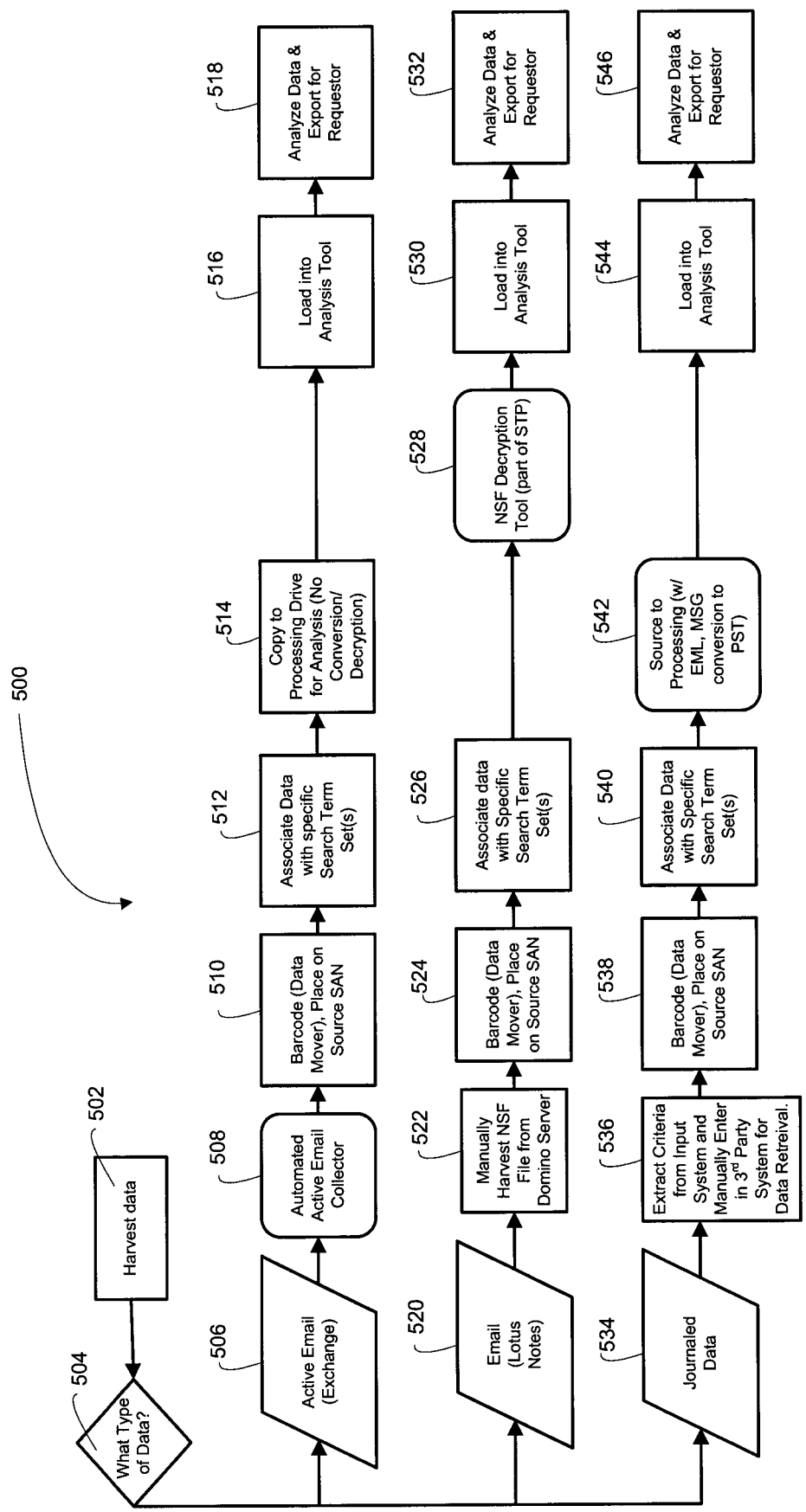
Figure 12:
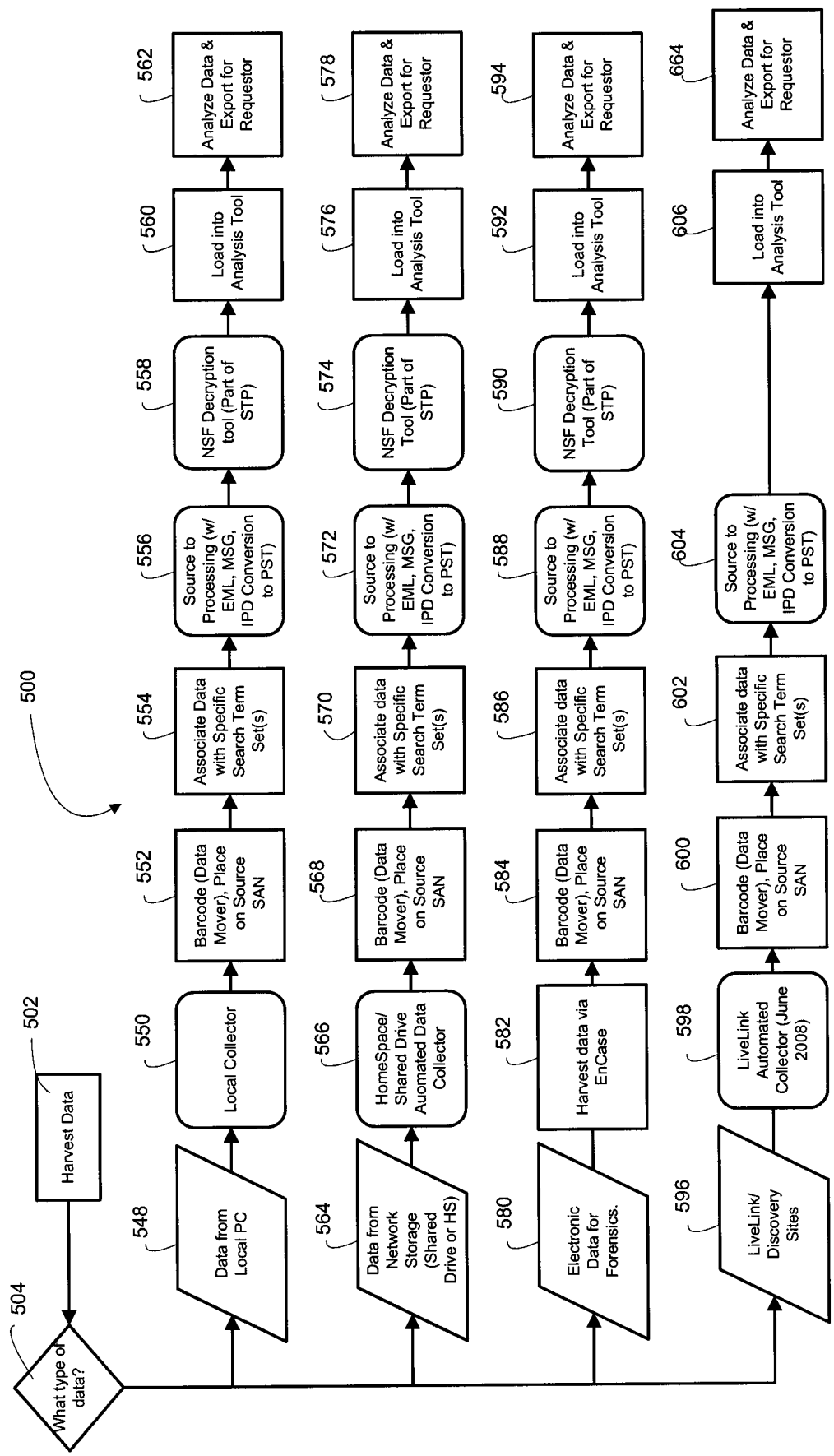

Having thus described embodiments of the invention in general terms, reference may now be made to the accompanying drawings:

FIG. 1 illustrates a flow diagram of a method for communicating a preservation notice and/or a survey to a custodian, in accordance with an embodiment of the present invention;

FIG. 2 illustrates a block diagram of an enterprise system in an enterprise environment, in accordance with an embodiment of the present invention;

FIG. 3 illustrates a mixed block and flow diagram of an enterprise system, in accordance with an embodiment of the present invention;

FIG. 4 illustrates a network environment in which the processes described herein are implemented, according to one embodiment of the invention;

FIG. 5 illustrates a block diagram of an electronic discovery manager server, in accordance with embodiment of the present invention;

FIG. 6 illustrates a block diagram of a database server, in accordance with an embodiment of the present invention;

FIG. 7 illustrates a block diagram of a collection server, in accordance with an embodiment of the present invention;

FIG. 8 illustrates block diagram illustrating electronic discovery management structure, in accordance with an embodiment of the invention;

FIG. 9 illustrates a flow diagram of a method for initiating a case or matter including creating search terms, creating and sending preservation notices, sending reminder notices and creating and sending surveys to custodians, in accordance with embodiments of the present invention;

FIG. 10 illustrates a flow diagram of a method for custodian management in an electronic discovery management system, in accordance with an embodiment of the present invention; and FIGS. 11 and 12 illustrate flow diagrams of methods for harvesting different data types in an electronic discovery management system; in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or any other apparatus), method (including, for example, a business process, computer-implemented process, and/or any other process and/or method), and/or any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product having a computer-readable storage medium having computer-executable program code portions embodied in the medium. As used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages. The computer program code may alternatively or additionally be written in one or more multi-paradigm programming languages, such as, for example, F#.

Some embodiments of the present invention are described herein with reference to flowchart illustrations and/or block diagrams of systems, methods, and computer program products according to embodiments of the invention. It will be understood that each block included in the flowchart illustrations and/or block diagrams, and combinations of blocks included in the flowchart illustrations and/or block diagrams, may be implemented by computer-executable program code. The computer-executable program code may be provided to a processor of a general purpose computer, special purpose computer, or other programmable data processing apparatus to produce a particular machine, such that the computer-executable program code portions, which execute via the processor of the computer or other programmable data processing apparatus, create mechanisms for implementing the functions and/or acts specified in the flowchart and/or block diagram block(s).

The computer-executable program code portions may also be stored in a computer-readable memory that can direct a computer and/or other programmable data processing apparatus to function in a particular manner, such that the instructions stored in the computer-readable memory produce an article of manufacture including instruction mechanisms which implement the function/act specified in the flowchart and/or block diagram block(s).

The computer-executable program code portions may also be loaded onto a computer or other programmable data processing apparatus to cause a series of operational steps to be performed on the computer and/or other programmable apparatus to produce a computer-implemented process such that the computer-executable program code which executes on the computer and/or other programmable apparatus provides steps for implementing the functions/acts specified in the flowchart and/or block diagram block(s). Alternatively, computer-implemented steps and/or acts may be combined with operator and/or human implemented steps and/or acts in order to carry out an embodiment of the present invention.

TERMS

As used herein, the term "data storage device" refers to any device on which data may be stored. It will be understood that examples of data storage devices include personal computers (for simplicity, sometimes referred to herein as "PCs"), servers, drives, engines, datastores, external hard drives, mobile phones, pagers, gaming consoles, personal digital assistants, conventional telephones, computer systems, network systems, front end systems, back end systems, and/or the like.

As used herein, the term "custodian" refers to a person who has access to data on a data storage device. In addition to having access, it will be understood that a custodian usually reads, writes, creates, stores, deletes, alters, changes, processes, and/or otherwise manipulates data on the data storage device. For simplicity, it will be understood that the terms "access," "accessible," and/or the like collectively refer to any and all of the many different ways a custodian may interact with data on a data storage device, unless it is explicitly stated otherwise.

As used herein, the term "enterprise" refers to a business, organization, association, and/or some other entity that usually includes one or more data custodians. For example, in some embodiments, an enterprise is a major corporation that employs several thousands of employees, some or all of which may be data custodians. As another example, in some embodiments, an enterprise refers to a small business having a single employee who is also the only data custodian. Unless explicitly stated otherwise, it will also be understood that the term "custodian" usually refers to an employee (current, former, full-time, part-time, contract, etc.) of an enterprise.

As used herein, the term "preserve" refers to the action and/or omission associated with maintaining, saving, storing, sustaining, and/or protecting data. It will be understood that, in some embodiments, data is not typically preserved if the data is deleted, manipulated, modified, overwritten, added to, changed, and/or altered from its original or previous form. However, it will be understood that, in accordance with some embodiments, there may be instances where data must be altered and/or otherwise manipulated for preservation purposes.

As used herein, the term "maintain" refers to an action and/or omission associated with owning, holding, controlling, operating, managing, servicing, storing, and/or otherwise maintaining (for simplicity, collectively referred to herein as "maintaining") a data storage device and/or data. In some embodiments, an enterprise maintains one or more data storage devices for the benefit of its custodians, one or more of which may be employees. For example, in some embodiments, the enterprise may own, but grant a custodian access to, a mobile phone. It will also be understood that, in accordance with some embodiments, a custodian may maintain one or more data storage devices from/to which the custodian reads, writes, stores, and/or otherwise manipulates data associated with the enterprise. For example, a custodian who is an employee of the enterprise may read data from and/or write data to a personal computer owned by the custodian for purposes of his employment. For simplicity, devices maintained by a custodian are typically referred to herein as "custodian" devices, and devices maintained by an enterprise are typically referred to herein as "enterprise" devices. Thus, in the two previous examples, the mobile phone used by the custodian but owned by the enterprise may be referred to as an "enterprise mobile phone," and the personal computer owned by the custodian and used for employment purposes may be referred to as a "custodian PC."

Preservation Notices and Surveys

In general terms, embodiments of the present invention refer to methods and apparatuses for electronic discovery and, more particularly, for communicating a preservation notice and/or a survey to and/or from a custodian in an enterprise. As mentioned previously herein, a critical part of any electronic discovery effort involves identifying, locating, and preserving data so that the data may be later collected and/or processed. To facilitate this effort, some embodiments of the present invention relate to communicating one or more preservation notices to one or more custodians in order to notify them of a responsibility and/or an obligation to preserve data and/or data storage devices to which they have access. Additionally or alternatively, some embodiments of the present invention relate to communicating one or more surveys to one or more custodians, where the one or more surveys request information relating to data and/or data storage devices to which the one or more custodians have access.

It will be understood that some of the embodiments described herein that relate to preservation notices and/or surveys are only part of a larger effort to manage electronic discovery. For example, some embodiments take the form of an electronic discovery management system that is configured to create electronic discovery matters, scan data storage devices for data, collect data from those data storage devices, and/or perform other functions associated with managing electronic discovery, in addition to, or instead of, creating and/or communicating preservation notices and/or surveys. Additional information regarding these other aspects of the present invention is described in more detail herein in connection with FIGS. 4-12.

It will also be understood that some embodiments of the present invention are operatively connected to, included within, and/or associated with an information technology platform of an enterprise. In some embodiments, the information technology platform includes and/or provides for many different types of networks and/or data storage devices. For example, some embodiments take the form of an electronic discovery management PC that is operatively connected to one or more enterprise data storage devices via an enterprise network. However, in other embodiments, some or all of the networks and/or data storage devices may not be maintained by an enterprise. For example, in some embodiments, an electronic discovery management server is operatively connected to one or more custodian data storage devices and one or more enterprise data storage devices, all via a public network, such as the Internet.

Referring now to FIG. 1, an electronic discovery management system having the general process flow 1 is provided, in accordance with an embodiment of the present invention. As represented by Block 2, the electronic discovery management system is configured to create (and/or facilitate a user of the electronic discovery management system to create) an electronic discovery matter. In some embodiments, the electronic discovery matter includes, and/or takes the form of, electronic data, such as, for example, a file or document. In some embodiments, the electronic discovery management system (and/or user) creates the electronic discovery matter by using an application and/or other software stored in memory in the electronic discovery management system. For example, in some embodiments, the system provides a user with a user interface that the user may use to create an electronic discovery matter and/or perform one or more of the other events in the process flow 1. It will be understood that the electronic discovery matter may include a name, number, profile, and/or other identifier. In some embodiments, this identifier may be assigned at random or based at least partially on the nature of the matter, the user creating the matter (if any), the date the matter was opened, the enterprise associated with the matter (if any), and/or some other configurable parameter.

It will also be understood that, in some embodiments, an electronic discovery matter is associated with one or more electronic discovery cases. For example, in some embodiments, a case may be a subset of matter, such that the matter is associated with one or more cases. In other embodiments, the reverse may be true. In still other embodiments, one matter is associated with only one case, such that there is a one-to-one relationship between matters and cases. In such embodiments, the matter and the case may have the same name, number, and/or identifier. In other embodiments, cases and matters are interchangeable and mean the same thing. For simplicity, it will be understood that the term "matter," as used herein, collectively refers to any and/or all of the many different relationships, configurations, and terminologies of "matter" and "case" that are possible, unless it is explicitly stated otherwise.

Still, in some embodiments, the distinction between a case and a matter may have significance. For example, in some embodiments, an electronic discovery management system may provide a user with access to electronic discovery cases but not access to electronic discovery matters, and/or vice versa. As another example, in the event of a legal proceeding, an electronic discovery matter may represent the overall legal proceeding, and one or more electronic discovery cases may represent one or more underlying discovery issues related to the overall legal proceeding. As still another example, in some embodiments, a matter is managed by a legal team, whereas a case is managed by an electronic discovery team.

As still another example, in some embodiments, including some embodiments where there is a one-to-one relationship between matters and cases, the electronic discovery matter may represent a first stage in an electronic discovery process, and the electronic discovery case may represent a later and/or different stage in the electronic discovery process. For example, in some embodiments, the electronic discovery management system is configured to communicate a preservation notice to one or more custodians added to an electronic discovery matter. In such embodiments, the electronic discovery management system may also be configured to collect data from one or more data storage devices accessible to one or more custodians added to an electronic discovery case. Thus, in such embodiments, a custodian will receive a preservation notice if the custodian is added to the matter, but the data associated with the custodian will not be collected unless the custodian is added to the case (sometimes referred to herein as "released from the matter to the case"). Conversely, in such embodiments, the data associated with the custodian will be collected if the custodian is added to the case, but the custodian will not receive a preservation notice unless the custodian is added to the matter.

After creating an electronic discovery matter, the electronic discovery management system having the process flow 1 is configured to add (and/or facilitate a user of the system to add) a custodian to the matter, as represented by Block 3. In some embodiments, any number and/or type of custodians may be added to (and/or deleted from) any number and/or type of matters. In some embodiments, an e-discovery manager uses a user interface provided by the system to add one or more custodians to the matter. For example, in some embodiments, the e-discovery manager may add a custodian to a matter by manually inputting the custodian's name, employee number, and/or some other identifier associated with the custodian into a user interface provided by the system, such as, for example, an "add custodian to matter" field in a graphical user interface. As another example, in some embodiments, the system provides a user interface for adding a custodian to a matter by linking a custodian identifier to a matter identifier, such as, for example, by "dragging and dropping" the custodian identifier into the matter identifier.

In some embodiments, when a custodian is added to a matter, information associated with the custodian (e.g., the custodian's name, employee number, contact information, the number and/or nature of other matters (and/or preservation notices and/or surveys) with which the custodian is associated, etc.) may also be added to the matter by the user and/or by the system. For example, in some embodiments, an e-discovery manager uses a user interface provided by the electronic discovery management system to add a custodian to a matter by linking a custodian profile to a matter profile. It will be understood that a custodian profile may include the custodian's name, contact information, employee number, and/or other information associated with the custodian, and that a matter profile may include the matter's name, the name and/or contact information for the e-discovery manager in charge of the matter, and/or other information associated with the matter. Thus, in some embodiments where a custodian is added to a matter by linking the custodian profile to the matter profile, all of the information in the custodian profile is automatically added to and/or otherwise associated with the matter profile.

Further, in some embodiments, after a custodian has been added to a matter, the custodian's name, profile, and/or other information takes the form of a link or other path that may be selected and/or followed to view, receive, and/or otherwise access information associated with the custodian and/or associated with other matters involving the custodian. Similarly, in some embodiments, the name, profile, and/or other identifier associated with the matter may take the form of a link or other path that may be selected and/or followed to view, receive, and/or otherwise access information associated with the matter. In some embodiments, the system provides a user interface that implements a hierarchical method of presenting matters and custodians. For example, in some embodiments, the user interface presents custodian profiles as subsets of matter profiles, such that when a matter profile is selected, some or all of the custodian profiles added to and/or otherwise associated with that particular matter profile are viewable, selectable, and/or accessible.

As represented by Block 4, the electronic discovery management system having the process flow 1 is also configured to create (and/or facilitate a user of the system to create) a preservation notice. In some embodiments, the preservation notice is automatically created by one or more portions of the system after a triggering event, such as, for example, after the custodian is added to the matter. In other embodiments, a user of the system must instruct one or more portions of the electronic discovery management system to create the preservation notice. In still other embodiments, a user of the system manually creates one or more portions of the preservation notice.

It will be understood that the preservation notice may include any kind and/or amount of information. In some embodiments, the preservation notice includes information regarding the preservation of data. For example, in some embodiments, the preservation notice instructs the custodian to preserve data on one or more data storage devices accessible to the custodian. In other embodiments, the preservation notice instructs the custodian to preserve only certain data and/or only data on certain data storage devices. For example, in some embodiments, the preservation notice instructs the custodian to preserve only data written, or in some way altered, by the custodian. Further, in some embodiments, the preservation notice includes information notifying the custodian that he or she is subject to, and/or has been released from (e.g., a preservation "release" notice), one or more legal holds. In some embodiments, the preservation notice asks the custodian to identify one or more data storage devices to which the custodian has access. Additionally or alternatively, in some embodiments, the preservation notice may include background and/or administrative information, such as, for example, a description of the e-discovery matter; why the matter specifically, and/or the e-discovery process in general, is important; the identity of, and/or the contact information for, the people involved in the matter, such as, for example, one or more attorneys and/or one or more paralegals working on the matter; what actions and/or omissions the custodian should take; whom to contact if the custodian has a question; and/or the like. It will be understood that, in some embodiments, the preservation notice includes approximately 4-6 pages of information, but in other embodiments, the preservation notice may be longer or shorter.

It will also be understood that, in some embodiments, the preservation notice is relatively generic and/or may include boilerplate information, whereas, in other embodiments, the preservation notice may be customized for, or in some other way based at least partially on, the matter, the custodian, and/or some other configurable parameter. For example, the preservation notice may identify and/or describe the matter and/or the custodian, describe what documents may be related to the matter and/or the e-discovery effort, and/or include questions for the custodian based at least partially on the custodian's employment experience, job description, clearance level, and/or some other characteristic unique to the custodian. In some embodiments, the system is configured to automatically customize the preservation notice based at least partially on the electronic discovery matter and/or the custodian.

In some embodiments, the system having the process flow 1 is configured to customize a preservation notice for a custodian based at least partially on whether the custodian has previously received a preservation notice, either for the current matter, for another matter, and/or just in general. (It will be understood that this previously received preservation notice is referred to herein as "another" preservation notice). For example, in some embodiments, the system is configured to automatically create a preservation notice for a custodian in an abbreviated form if the system (and/or user) determines that the custodian has previously received another preservation notice. In some embodiments, a preservation notice created in an abbreviated form serves as a reminder notice (described in more detail later herein). Further, in some embodiments, the system is configured to customize a preservation notice based at least partially on the custodian's familiarity with the preservation notice and/or electronic discovery process. For example, for custodians less familiar with the process, the system may create (and/or facilitate a user to create) a preservation notice that gives examples of the types of data storage devices and/or data that may be relevant to the e-discovery process.

Further, in some embodiments, the preservation notice includes a list of the custodians that have received (or will receive) the same preservation notice (and/or are or will be associated with the same matter) as the custodian. In some embodiments, the preservation notice requests the custodian to identify one or more additional custodians that the custodian believes should also receive the same preservation notice and/or be associated with (e.g., added to) the same matter. In some embodiments, the preservation notice includes a selectable button, a fillable field, a link, and/or some other functionality that permits the custodian to identify these additional custodians. In some embodiments, the functionality permits the custodian to directly add the one or more additional custodians to the matter and/or communicate the preservation notice to those additional custodians. In some embodiments, the system having the process flow 1 is configured to automatically communicate the preservation notice to these one or more additional custodians once they have been identified and/or selected by the custodian.

It will also be understood that the preservation notice may include and/or take any form. For example, in some embodiments, the preservation notice includes and/or takes the form of a voice-mail, e-mail, electronic word document, fax, page, text message, instant message, Internet and/or intranet web page, physical and/or tangible document, and/or the like. It will be understood that the preservation notice may include one or more characters, numbers, words, images, audio portions, video portions, links, and/or the like.

It will also be understood that, additionally or alternatively, in some embodiments, the preservation notice includes and/or takes the form of a legal hold, which may impede or preclude the custodian from accessing one or more data storage devices and/or performing certain tasks. The legal hold may include any type and/or amount of information. The legal hold may also take any form, including, for example, an electronic stop executed by the e-discovery manager, an instruction from an attorney issued in a physical memorandum, and/or the like.

It will also be understood that, in some embodiments where the system having the process flow 1 provides a user interface for linking one or more custodian profiles to one or more matter profiles, the system or a system user may link one or more preservation notices to one or more custodian profiles and/or to one or more matter profiles. In some embodiments, the system provides a user interface that implements a hierarchical method of presenting matters, custodians, and preservation notices, such that when a matter profile is selected, some or all of the preservation notices added to and/or otherwise associated with that particular matter profile are viewable, selectable, and/or accessible. Similarly, in some embodiments, when a custodian profile is selected, some or all of the preservation notices associated with that particular custodian profile are viewable, selectable, and/or accessible.

As represented by Block 4A, the electronic discovery management system having the process flow 1 is also configured to communicate (and/or facilitate a user of the system to communicate) the preservation notice to the custodian. It will be understood that the system may communicate any number of preservation notices to any number of custodians. For example, in some embodiments, the system having the process flow 1 is configured to create (and/or facilitate a user to create) several preservation notices for a single electronic discovery matter, such that any one custodian may receive one or more of these preservation notices. In some embodiments, the system is configured to communicate the same preservation notice to two or more (or all) custodians. However, in other embodiments, the system is configured such that no two custodians ever receive the same preservation notice.

It will also be understood that the system may communicate a preservation notice using any form of communication, such as, for example, an e-mail, voice mail, automated call, text message, instant message, fax, page, and/or the like. Further, the system may communicate a preservation notice to any type of device, including, for example, a personal computer, mobile phone, conventional phone, personal digital assistant, fax machine, pagers, and/or the like. For example, in some embodiments, the preservation notice appears as a message in the custodian's e-mail inbox, such that the custodian may select and open the message in order to access the preservation notice.

In some embodiments, the system having the process flow 1 is configured to communicate a preservation notice to a custodian using contact information for the custodian that is accessible to the system. For example, in some embodiments, the system has access to a custodian directory that lists the contact information for each custodian in an enterprise. In such embodiments, the custodian directory may include multiple ways to contact a custodian, and/or may include information regarding preferred and secondary methods of contact. In some embodiments, a user manually enters some or all of the contact information for a custodian into the system in order to communicate the preservation notice to the custodian. As another example, in some embodiments, the system uses contact information from a custodian profile to communicate the preservation notice to the custodian.

In some embodiments, the system having the process flow 1 is configured to automatically communicate a preservation notice to the custodian upon or after a triggering event. Examples of triggering events include, but are not limited to, the preservation notice being created, the custodian being added to the matter, the preservation notice being linked to a custodian profile (and/or other identifier), another custodian identifying the custodian as someone who should receive the preservation notice and/or be associated with the matter, receiving the authorization of an e-discovery manager to communicate the preservation notice to the custodian, etc. In still other embodiments, the system having the process flow 1 is configured to facilitate a user of the system (e.g., an e-discovery manager) to manually communicate a preservation notice to a custodian.

As represented by Block 5, the electronic discovery management system having the process flow 1 may be additionally or alternatively configured to create (and/or facilitate a user of the system to create) a survey to send the custodian. In some embodiments, the survey is automatically created by one or more portions of the system after a triggering event, such as, for example, upon or after creating the preservation notice. In other embodiments, a user of the system must instruct one or more portions of the electronic discovery management system to create the survey. In still other embodiments, a user of the system manually creates one or more portions of the survey.

It will be understood that the survey may include any kind and/or amount of information. In some embodiments, the survey includes one or more questions about the data and/or data storage devices to which the custodian has access. For example, in some embodiments, the survey asks the custodian to provide the names and locations of any and all of the enterprise and/or non-enterprise data storage devices from/to/on which the custodian reads, writes, stores, and/or otherwise manipulates data. In other embodiments, the survey includes more-specific questions about the nature of the data accessible to the custodian. For example, in some embodiments, the survey asks the custodian whether any of the data read, stored, written, and/or otherwise manipulated by the custodian relates to the e-discovery effort. According to some embodiments, the survey may include one or more questions in the form of yes/no, true/false, multiple choice, matching, short answer, and/or essay questions. In some embodiments, every survey includes one or more of the same questions as every other survey created by the system. For example, in some embodiments, every survey created by the system automatically includes the same five default questions, even though additional questions may be later added or some of the original five default questions may be later removed.

It will be understood that, in some embodiments, the survey is relatively generic and/or may include boilerplate information and/or questions, whereas, in other embodiments, the survey may be customized for, or in some other way based at least partially on, the matter, the custodian, and/or some other configurable parameter. For example, the survey may identify and/or describe the matter and/or the custodian, describe what documents may be related to the matter and/or the e-discovery effort, and/or include questions for the custodian based at least partially on the custodian's employment experience, job description, clearance level, and/or some other characteristic unique to the custodian. In some embodiments, the system is configured to automatically customize the survey based at least partially on the electronic discovery matter and/or the custodian. In some embodiments, the survey includes information about, and/or seeks to confirm, the devices and/or locations to which the custodian stores and/or otherwise accesses data. As another example, in some embodiments, the survey provides background and/or administrative information.

In some embodiments, the system having the process flow 1 is configured to customize a survey for a custodian based at least partially on whether the custodian has previously received a survey, either for the current matter, for another matter, and/or just in general. (It will be understood that this previously received survey is referred to herein as "another" survey). For example, in some embodiments, the system is configured to automatically create a survey for a custodian in an abbreviated form if the system (and/or user) determines that the custodian has previously received another survey. In some embodiments, a survey created in an abbreviated form serves as a reminder notice (described in more detail later herein). Further, in some embodiments, the system is configured to customize a survey based at least partially on the custodian's familiarity with the survey and/or electronic discovery process. For example, for custodians less familiar with the process, the system may create (and/or facilitate a user to create) a survey that gives examples of the types of data storage devices and/or data that may be relevant to the e-discovery process.

Further, in some embodiments, the survey provides a list of the custodians that have received (or will receive) the same survey (and/or are or will be associated with the same matter) as the custodian. In some embodiments, the survey requests the custodian to identify one or more additional custodians that the custodian believes should also receive the same survey and/or be associated with the same matter. In some embodiments, the survey includes a selectable button, a fillable field, a link, and/or some other functionality that permits the custodian to identify these additional custodians. In some embodiments, the functionality permits the custodian to directly add the one or more additional custodians to the matter and/or communicate the survey to those additional custodians. In some embodiments, the system having the process flow 1 is configured to automatically communicate the survey to these one or more additional custodians once they have been identified and/or selected by the custodian.

It will be understood that, in some embodiments, the survey includes the preservation notice, and/or vice versa. For example, in some embodiments after the custodian has already been sent the preservation notice, the survey includes a summary and/or reminder of the preservation notice, such as, for example, a short paragraph outlining the preservation responsibilities and/or obligations required and/or expected of the custodian. Also, in some embodiments, the survey may include one or more questions related to one or more preservation notices and/or matters. Alternatively, in some embodiments, the survey is linked to and/or includes a link to one or more preservation notices, and/or the preservation notice is linked to and/or includes a link to one or more surveys.

It will also be understood that the survey may include and/or take any form. For example, in some embodiments, the survey includes and/or takes the form of a voice-mail, e-mail, fax, page, text message, instant message, Internet and/or intranet web page, electronic word document, physical and/or tangible document, and/or the like. It will be understood that the survey may include one or more characters, numbers, words, images, audio portions, video portions, links, and/or the like. It will also be understood that, additionally or alternatively, in some embodiments, the survey includes and/or takes the form of a legal hold, which may impede or preclude the custodian from accessing one or more data storage devices and/or performing one or more tasks.

In some embodiments, the survey communicated to the custodian may be configured to be completed by the custodian and returned to the system. For example, in some embodiments, the survey includes and/or takes the form of a document having one or more fillable fields, such that the custodian may access, complete, save, and/or communicate the survey with one or more answers back to the system having the process flow 1. In some embodiments, the survey is configured to be automatically returned to the system after the custodian has responded to the survey. In some embodiments, the survey response is returned after the passage of a predetermined period of time, after the custodian verifies the survey response, and/or after some other triggering event. In still other embodiments, however, the survey is configured to be printed out, completed, and/or physically and/or electronically returned to a user of the system having the process flow 1.

It will also be understood that, in some embodiments where the system having the process flow 1 provides a user interface for linking one or more custodian profiles to one or more matter profiles, the system or a system user may link one or more surveys to one or more custodian profiles and/or to one or more matter profiles. In some embodiments, the system provides a user interface that implements a hierarchical method of presenting matters, custodians, and surveys, such that when a matter profile is selected, some or all of the surveys added to and/or otherwise associated with that particular matter profile are viewable, selectable, and/or accessible. Similarly, in some embodiments, when a custodian profile is selected, some or all of the surveys associated with that particular custodian profile are viewable, selectable, and/or accessible.

In some embodiments, as represented by Block 5A, the electronic discovery management system having the process flow 1 is configured to communicate (and/or facilitate a user of the system to communicate) the survey to the custodian. It will be understood that the system may communicate any number of surveys to any number of custodians. For example, in some embodiments, the system having the process flow 1 is configured to create (and/or facilitate a user to create) several surveys for a single electronic discovery matter, such that any one custodian may receive one or more of these surveys. In some embodiments, the system is configured to communicate the same survey to two or more (or all) custodians. However, in other embodiments, the system is configured such that no two custodians ever receive the same survey.

It will also be understood that the system may communicate a survey using any form of communication, such as, for example, an e-mail, voice mail, automated call, text message, instant message, fax, page, and/or the like. Further, the system may communicate a survey to any type of device, including, for example, a personal computer, mobile phone, conventional phone, personal digital assistant, fax machine, pager, and/or the like. For example, in some embodiments, the survey appears as a message in the custodian's e-mail inbox, such that the custodian may select and open the message in order to access the survey.

As with the preservation notice, in some embodiments, the system having the process flow 1 may be configured to communicate a survey to a custodian using contact information for the custodian that is accessible to the system. However, in some embodiments, a user manually enters some or all of the contact information for a custodian into the system in order to communicate the survey to the custodian. Also, in some embodiments, the system having the process flow 1 is configured to automatically communicate a survey to the custodian after the survey has been created, after the custodian has been added to the matter, and/or after some other triggering event (e.g., the survey being linked to a custodian profile, the system receiving an evidence request, etc.). In still other embodiments, the system having the process flow 1 is configured to facilitate a user of the system to manually communicate a survey to a custodian. Also, in some embodiments, the system is configured to communicate (and/or facilitate a user to communicate) the survey at the same time as the preservation notice, or vice versa.

In some embodiments, the electronic discovery management system having the process flow 1 is configured to communicate information associated with the preservation notice and/or the survey instead of, or in addition to, the actual preservation notice and/or actual survey. For example, in some embodiments, this information includes one or more locations of, and/or one or more links to, the actual preservation notice(s) and/or survey(s). In such embodiments, the preservation notice(s) and/or survey(s) may be communicated to, stored and/or located in and/or on a "holds" portal (discussed in more detail below in connection with reminder notices), a matter profile, a web page, a file server, an intranet location, and/or some other network location. As another example, in some embodiments, the system is configured to notify the custodian that a preservation notice and/or survey has been sent to a particular physical location, such as, for example, to a particular office or mailbox for pick-up. As still another example, in some embodiments, the system is configured to communicate an automated voice mail to a mobile phone or conventional telephone accessible to the custodian, where the voice mail confirms that the preservation notice and/or survey has been faxed (or otherwise communicated) to the custodian.

Further, in some embodiments, the information associated with the preservation notice and/or survey may include information associated with an overview and/or status of some or all of the custodian's past and/or present legal holds and/or associated preservation notices and/or surveys. For example, in some embodiments, the information includes which and/or how many preservation notices and/or surveys the custodian has been sent. As another example, in some embodiments, the information includes which and/or how many preservation notices the custodian has acknowledged and/or not acknowledged, to which and/or how many surveys the custodian has provided a response and/or has not provided a response, and/or other information associated with the status of one or more preservation notices and/or surveys.

In some embodiments, as represented by Block 4B, the system having the process flow 1 is additionally or alternatively configured to receive (and/or facilitate a user of the system to receive) an acknowledgement from the custodian. It will be understood that the acknowledgement may include any amount and/or type of information. For example, in some other embodiments, the acknowledgement includes an assertion by the custodian that the custodian has received, opened, read, understood, and/or manipulated the preservation notice. It will also be understood that the acknowledgement may include and/or take any form, including one or more of the forms previously mentioned herein. For example, in some embodiments, the acknowledgement is a custodian- and/or system-created read receipt, e-mail, document, voice mail, telephone call, text message, instant message, and/or some other form of communication from the custodian to the system and/or to a user of the system.

In some embodiments, the acknowledgement (and/or information associated with the acknowledgement) is included in and/or associated with the preservation notice. For example, in some embodiments, the preservation notice includes instructions for the custodian to create and/or communicate an acknowledgement to the electronic discovery management system having the process flow 1 (and/or to a user of that system). As another example, in some embodiments, a fillable field, selectable button, link and/or some other functionality is included in the preservation notice that the custodian may utilize to execute and/or communicate the acknowledgement to the system. As another example, in some embodiments, the acknowledgment takes the form of a read receipt and/or the like that is automatically transmitted (and/or manually transmitted by the custodian) to the system after the custodian has received, opened, read, understood, and/or manipulated the preservation notice. In some embodiments, the system is configured to identify and/or execute an acknowledgement on behalf of the custodian once the custodian receives, opens, reads, understands, and/or manipulates the preservation notice. In some embodiments, an acknowledgement of one preservation notice may serve as an acknowledgement for one or more other preservation notices associated with one or more other matters.

In some embodiments, as represented by Block 5B, the system having the process flow 1 is additionally or alternatively configured to receive (and/or facilitate a user of the system to receive) a survey response from the custodian. It will be understood that the survey response may include any amount and/or type of information. For example, in some other embodiments, the survey response includes one or more answers to the one or more questions included in the survey that was transmitted to the custodian. It will also be understood that the survey response may include and/or take any form, including one or more of the forms previously mentioned herein. For example, in some embodiments, the survey response takes the form of a custodian- and/or system-created e-mail, document, voice mail, text message, instant message, and/or the like. In some embodiments, the form of the survey response is such that the system is configured to read and/or process some or all of the information provided in the survey response. However, in other embodiments, some or all of the information provided in the survey response must be manually entered and/or inputted into the system in order for the system to read and/or process the information.

Further, in some embodiments, the system is configured to use information from the survey response in order to associate previously unknown data storage devices and/or data to the custodian. In some embodiments, the system uses the information from the survey response to collect data for e-discovery purposes (described in more detail later herein). Also, in some embodiments, the system is configured to notify one or more users of the system (e.g., an e-discovery manager) upon or after receiving the survey response from the custodian. It will be understood that this notification may take any of the forms, and may be communicated by any of the means, previously described herein.

In some embodiments, the survey response (and/or information associated with the survey response) is included in and/or associated with the survey. For example, in some embodiments, the survey includes instructions for the custodian to complete and communicate a survey response to the electronic discovery management system having the process flow 1 (and/or a user of that system). In some embodiments, the survey takes the form of an electronic document having one or more fillable fields, such that the custodian may respond to the survey and communicate the survey response to the system having the process flow 1 for processing. In some embodiments, the survey is configured to be automatically transmitted to the system and/or to a user of the system once the custodian completes the survey. In some embodiments, a survey response for one matter may serve as a survey response for one or more other matters.

In some embodiments, the electronic discovery management system having the process flow 1 is configured to receive information associated with the acknowledgement and/or the survey response instead of, or in addition to, the actual acknowledgement and/or actual survey response. For example, in some embodiments, the system is configured to receive an e-mail having one or more links (and/or other paths) that the system and/or a user of the system may follow to access the acknowledgement and/or survey response. In such embodiments, the actual acknowledgement and/or survey response may be located in and/or on a web page, file server, a holds portal, an intranet and/or Internet location, and/or some other network location. As another example, in some embodiments, the system is configured to receive information associated with an acknowledgement and/or a survey response that is configured to be read by the system only and not by a person.

As represented by Block 6, the electronic discovery management system having the process flow 1 may additionally or alternatively be configured to release (and/or facilitate a user of the system to release) the custodian from the matter to the case. As represented by Block 7, the system may additionally or alternatively be configured to identify, locate, and/or collect (and/or facilitate a user of the system to identify, locate, and/or collect) data from devices to which the custodian has access. It will be understood that the inclusion of these events in FIG. 1 serve to illustrate the broader contexts in which the system may exist and/or the possible additional functions of the system. It will also be understood that additional information regarding these contexts and/or these functions are discussed in more detail herein in connection with FIGS. 4-12.

Additionally, it will be understood that one or more of the events represented by Blocks 2-7 may serve as a triggering event for one or more of the other events represented by Blocks 2-7. For example, in some embodiments, once an e-discovery manager adds a custodian to an electronic discovery matter, the system is configured to automatically create a preservation notice to send the custodian. As another example, in some embodiments, once the system receives an acknowledgement from the custodian, the system is configured to automatically create and/or communicate the survey to the custodian. As another example, in some embodiments, once an e-discovery manager links a preservation notice and/or a survey to a custodian profile (and/or other identifier), the system is configured to automatically communicate the preservation notice and/or the survey (and/or information associated therewith) to the custodian at a data storage device accessible to the custodian. As still another example, in some embodiments, once the custodian is released from the matter to the case, the system is configured to automatically collect data from one or more devices to which the custodian has access.

As used herein, it will be understood that a "triggering event" may automatically trigger a triggered action immediately, nearly immediately, or sometime after (e.g., within the same day, week, month, etc.) the occurrence of the triggering event. For example, in some embodiments, once an e-discovery manager releases a custodian from an electronic discovery matter to an electronic discovery case, the system is configured to immediately and automatically collect data from one or more devices to which the custodian has access. However, in other embodiments, once an e-discovery manager releases a custodian from a matter to a case, the system is configured to automatically collect the data after a three day waiting period. Of course, it will also be understood that the triggering event in some embodiments is a predetermined time and/or the passage of a predetermined period of time.

Further, it will be understood that the number, type, and/or order of the steps and/or events represented by Blocks 2-7 are exemplary and may vary. For example, in some embodiments, the system does not need to create the preservation notice and/or the survey before communicating it/them to the custodian because the preservation notice and/or survey may have been previously created by the system, by another person, and/or by another device. As another example, in some embodiments, the system is configured to create and/or communicate a survey only after receiving an evidence request from, for example, an electronic discovery team. As still another example, in the event of a criminal investigation where the custodian is a suspect, the system may be configured to not send the custodian a preservation notice or a survey because the custodian does not need to know and/or should not know about the e-discovery effort.

Of course, in some embodiments, the system may be configured to perform additional functions. For example, in some embodiments, the system is configured to scan a network for data and/or data storage devices accessible to the custodian. This aspect of the invention is discussed in more detail herein in connection with FIGS. 4-12.

As another example, in some embodiments, the system is configured to communicate a message (e.g., to the information technology (IT) group within the enterprise and/or to one or more other persons) that the custodian has been sent a preservation notice and/or survey and/or is subject to a legal hold. In some embodiments, the message instructs and/or authorizes the IT group to monitor the custodian's activity and/or to impede and/or deny the custodian access to certain data storage devices and/or data. In other embodiments, the message serves to notify members of the legal and/or e-discovery team of the status of one or more of the custodian's legal holds and/or associated preservation notice(s) and/or survey(s). For example, in some embodiments, the message includes information associated with whether the system has sent a preservation notice and/or survey to the custodian, and/or whether the custodian has communicated, to the system and/or member of the e-discovery team, an acknowledgement and/or a survey response.

As another example, in some embodiments, the system is configured to use a "do-not-contact" list that includes, for example, information regarding the responsiveness of one or more custodians and/or the appropriateness of contacting one or more custodians. For example, where the custodian is president of an enterprise and questions in a survey would be better directed to someone else, the system may be configured, in accordance with some embodiments, to communicate the survey to an agent, associate, assistant, secretary, and/or some other person associated with the custodian. It will be understood that, in some embodiments, the "do-not-contact" list may be used in connection with communicating preservation notices and/or other information as well. However, in some embodiments, the "do-not-contact" list merely serves to distinguish, to users (e.g., e-discovery managers) of the system, certain custodians (e.g., senior executives) from others and does not affect how the system performs any function.

As still another example, in some embodiments, the system is configured to create (and/or facilitate a user of the system to create) and/or communicate (and/or facilitate a user of the system to communicate) a reminder notice. It will also be understood that the reminder notice may include any information and/or take any form (e.g., a reminder e-mail, a reminder automated telephone call, etc.). In some embodiments, the reminder notice serves to remind the custodian that he or she is subject to (and/or has been released from) one or more legal holds and/or one or more preservation notices and/or surveys. In some embodiments, the reminder notice includes a reminder for the custodian to provide and/or communicate an acknowledgement and/or a survey response to the system (and/or to a user of the system).

In some embodiments, the reminder notice includes information associated with some or all of the legal holds and/or associated preservation notices and/or surveys previously communicated to and/or otherwise associated with the custodian. For example, in some embodiments, the reminder notice provides an overview and/or a status of some or all of the custodian's past and/or present legal holds and/or associated preservation notices and/or surveys. In some embodiments, this information includes which and/or how many preservation notices and/or surveys the custodian has been sent, which and/or how many preservation notices the custodian has acknowledged and/or not acknowledged, to which and/or how many surveys the custodian has provided a response and/or has not provided a response, etc. However, in other embodiments, the reminder notice is identical to one or more preservation notices and/or surveys initially or previously communicated to the custodian. In still other embodiments, instead of being identical, the reminder notice takes the form of an abbreviated version of the one or more preservation notices and/or surveys initially or previously communicated to the custodian. In some embodiments, the reminder notice provides one or more links to and/or identifies the location at which the custodian can access one or more preservation notices and/or surveys associated with the custodian (e.g., a holds portal).

It will be understood that the reminder notice may be communicated manually by a user of the system having the process flow 1, and/or may communicated automatically by the system upon or after a triggering event. In some embodiments, the triggering event includes one or more predetermined times (e.g., at 3:00 pm on Monday, September 18, etc.) and/or periods of time (e.g., one week after originally sending a preservation notice to the custodian, etc.). In some embodiments, a reminder notice may be communicated to the custodian on a recurring schedule, such that, for example, the custodian may receive a reminder notice every 80 days that shows the custodian the status of each of his or her legal holds and/or associated preservation notices and/or surveys.

In some embodiments of the present invention, the reminder notice includes information that refers the custodian to a holds portal where the custodian may view, access, and/or manipulate one or more legal holds and/or associated preservation notices and/or surveys. Thus, it will be understood that, in some embodiments, the system having the process flow 1 may also be configured to communicate and/or store one or more preservation notices and/or surveys in the holds portal. In some embodiments, the holds portal is also where a custodian can create, save, execute, write, manipulate, and/or communicate to the system an acknowledgement and/or a survey response. In some embodiments, the holds portal may be private to the custodian (e.g., the custodian must use a username and/or password to access his or her holds portal). However, in other embodiments, the holds portal may be public, such that one or more other custodians can also access the holds portal.

Referring now to FIG. 2, a block diagram of an enterprise system 10 in an enterprise environment is provided, in accordance with an embodiment of the present invention. As shown in FIG. 2, the enterprise system 10 includes an enterprise network 11, an electronic discovery management system 12, an enterprise file server 18, an enterprise mobile phone 20, and an enterprise PC 22. Each of the devices of the enterprise system 10 is selectively and operatively connected to each other via the enterprise network 11. Also shown in the enterprise environment illustrated in FIG. 2 are an enterprise external hard drive 19, a custodian PC 21, and a custodian 29. The enterprise external hard drive 19 and the custodian PC 21 are not operatively connected to the enterprise network 11. However, it will be understood that the custodian 29 has access to the enterprise external hard drive 19 and the custodian PC 21, as well as to the enterprise mobile phone 20 and the enterprise PC 22. For purposes of the embodiment shown in FIG. 2, it will also be understood that the custodian 29 maintains the custodian PC 21, and the enterprise maintains, but provides the custodian 29 access to, the enterprise network 11, the enterprise external hard drive 19, the enterprise mobile phone 20, and the enterprise PC 22. It will also be understood that the enterprise file server 18 is configured to back up some or all of the data stored on one or more of the enterprise devices at predetermined times. Thus, while the custodian 29 does not have access to the enterprise file server 18, some or all of the data written, read, and/or modified by the custodian 29 is stored in the enterprise file server 18.

In some embodiments, the enterprise network 11 is configured to enable one or more enterprise devices to communicate with each other. Also, in some embodiments, the enterprise network 11 takes the form of a secure and private network that is maintained by the enterprise and/or an agent or employee of the enterprise, such as, for example, an enterprise network administrator. It will also be understood that the enterprise network 11 may include one or more separate networks and/or one or more domains within the network(s). Further, it will be understood that the enterprise network 11 may, in some embodiments, include a local area network (LAN), a wide area network (WAN), and/or global area network (GAN), such as the Internet. In addition, the enterprise network 11 may include wireless and/or wireline technology.

In some embodiments, the electronic discovery management system 12 is configured to manage electronic discovery, and more particularly, to transmit and/or receive information associated with one or more preservation notices, surveys, acknowledgments, and/or survey responses. Although the electronic discovery management system 12 takes the form of a computer system in FIG. 2, it will be understood that, in other embodiments, one or more personal computers, servers, engines, drives, mobile devices, front end systems, back end systems, and/or any other computing devices may be used instead. As shown in FIG. 2, the electronic discovery management system 12 includes a communication interface 13, a processor 14, and a memory 15 having an electronic discovery application 16 and an electronic discovery datastore 17. The communication interface 13 is operatively connected to the processor 14, and the processor 14 is operatively connected to the memory 15.

Each communication interface described herein, including the communication interface 13, generally includes hardware and, in some instances, software, that enables a portion of the enterprise system 10, such as the electronic discovery management system 12, to transmit information to and/or from the communication interface of one or more other portions of the enterprise system 10. For example, the communication interface 13 of the electronic discovery management system 12 may include a modem, server, electrical connection, and/or other electronic device that operatively connects the electronic discovery management system 12 to another electronic device, such as the electronic devices that make up the enterprise PC 22.

Each processor described herein, including the processor 14, generally includes circuitry for implementing the audio, visual, and/or logic functions of that portion of the enterprise system 10. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based on computer-executable program code portions thereof, which may be stored, for example, in a memory device, such as in the electronic discovery application 16 of the memory 15 of the electronic discovery management system 12.

Each memory device described herein, including the memory 15 for storing the electronic discovery application 16 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides, such as the electronic discovery management system 12, to implement the functions of the system within which the memory resides, such as the electronic discovery management system 12.

As shown in FIG. 2, the memory 15 includes the electronic discovery application 16. In some embodiments, the electronic discovery application 16 is configured to manage electronic discovery and communicate with the one or more devices operatively connected to the enterprise network 11. For example, in some embodiments, the electronic discovery application 16 is configured to provide to a user of the electronic discovery management system 12 a dashboard environment, a graphical user interface, and/or some other user interface for managing electronic discovery. In some embodiments, the electronic discovery application 16 is configured to create an electronic discovery matter, add one or more custodians to the matter, and/or the like. As another example, in some embodiments, the electronic discovery application 16 is configured to scan one or more devices connected to the enterprise network 11 for data related to an electronic discovery matter. As another example, in some embodiments, the electronic discovery application 16 is configured to transmit and/or receive information associated with one or more preservation notices, surveys, acknowledgements, and/or survey responses. It will be understood that, in some embodiments, the electronic discovery application 16 includes computer-executable program code portions for instructing the processor 14 to perform any one or more of the functions of the electronic discovery application 16 and/or electronic discovery management system 12. Further, in some embodiments, the electronic discovery application 16 may include and/or use one or more network and/or system communication protocols.

In addition to the electronic discovery application 16, the memory 15 also includes the electronic discovery datastore 17. The electronic discovery datastore 17 may include any one or more storage devices, including, but not limited to, datastores, databases, and/or any of the other storage devices typically associated with a computer system. Additionally, the electronic discovery datastore 17 may include any type and/or amount of information related to the functions of the one or more portions of the electronic discovery management system 12, as described herein. Further, it will be understood that the electronic discovery datastore 17 may store any kind of information and/or information in any known way, such as, for example, one or more computer codes and/or languages, alphanumeric character strings, data sets, figures, tables, charts, links, documents, files, audio files, video files, images, and/or the like.

In some embodiments, the electronic discovery datastore 17 includes information associated with managing electronic discovery. For example, in some embodiments, the electronic discovery datastore 17 includes information associated with a matter and/or a case, such as, for example, a case profile (which is described in more detail later herein). As another example, in some embodiments, the electronic discovery datastore 17 includes information associated with one or more preservation notices, surveys, acknowledgements, and/or survey responses. For example, in some embodiments, the electronic discovery datastore 17 includes information associated with creating customized preservation notices and/or surveys based at least partially on a custodian, matter, and/or some other configurable parameter. As another example, in some embodiments, the electronic discovery datastore 17 includes custodian contact information for use in communicating preservation notices and/or surveys. As still another example, in some embodiments, the electronic discovery datastore 17 includes information associated with if/when/whether one or more preservation notices and/or surveys have been sent to the custodian 29, and/or if/when/whether one or more acknowledgements and/or survey responses have been received by the electronic discovery management system 12 from the custodian 29.

Additionally or alternatively, in some embodiments, the electronic discovery datastore 17 includes information associated with the electronic discovery application 16, one or more portions of the electronic discovery management system 12, and/or one or more portions of the enterprise system 10 and/or one or more portions of the enterprise environment shown in FIG. 2. It will be understood that, in some embodiments of the present invention, the electronic discovery datastore 17 provides a substantially real-time representation of the information stored therein, so that when the processor 14 accesses the electronic discovery datastore 17, the information stored therein is current and/or substantially current.

Also illustrated in FIG. 2 is an enterprise PC 22, in accordance with an embodiment of the present invention. The enterprise PC 22 includes a communication interface 23, a processor 24, and a memory 25, which includes a word processing application 27 and an enterprise PC datastore 26 stored therein. As shown, the communication interface 23 is operatively connected to the processor 24, and the processor 24 is operatively connected to the memory 25.

It will be understood that the enterprise PC 22 may include the devices and have the functions typically associated with a personal computer that is operatively connected to a network. For example, in some embodiments, a custodian reads, writes, modifies, processes, and/or communicates data using the word processing application 27. As another example, in some embodiments, a custodian stores data, which may be created by the word processing application 27 and/or some other application, in the enterprise PC datastore 26. In some embodiments, a custodian uses an e-mail application (not shown), an Internet browser (not shown), the word processing application 27, and/or some other software and/or hardware component of the enterprise PC 22 to receive and/or transmit one or more preservation notices, surveys, acknowledgements, and/or survey responses to and/or from the electronic discovery management system 12.

It will be understood that the inclusion of the enterprise PC 22 in FIG. 2, along with the enterprise file server 18 and the enterprise mobile phone 20, serve to illustrate that a variety of devices may be operatively connected to the enterprise network 11. It will also be understood that the inclusion of the custodian PC 21 and the enterprise external hard drive 19 serve to illustrate that the custodian may have access to, and/or the electronic discovery effort managed by the electronic discovery management system 12 may include, some devices that are not operatively connected to the enterprise network 11. It will be understood that these devices typically include a communication interface, a processor, and a memory, and/or may be similar to, or the same as, devices previously described herein.

Although not shown, it will be understood that one or more of the devices shown in FIG. 2 (and/or included in other embodiments of the present invention) may include one or more user input devices. In some embodiments, the one or more user input devices take the form of a mouse and/or a keyboard, such as those commonly associated with a PC. In other embodiments, the one or more user input devices may include one or more buttons, keys, dials, levers, directional pads, joysticks, accelerometers, microphones, touchpads, touchscreens, haptic interfaces, microphones, scanners, motion detectors, cameras, and/or the like for receiving information from a user of the device. In some embodiments, the user input device is integrated with another device, such as, for example, a keypad and/or keyboard disposed on a mobile phone. In some embodiments, the user input device is specific for the device for which it is used, such as, for example, a controller configured to receive device-specific inputs, such as a series of controller or joystick movements, from a user of the device. Also, it will be understood that one or more of the devices shown in FIG. 2 (and/or included in other embodiments of the present invention) may include one or more output devices, such as, for example, a display and/or speaker for presenting information to a user of the device.

It will also be understood that the electronic discovery management system 12 and/or enterprise system 10 may include and/or implement any embodiment described herein, including one or more of the embodiments of the system having the process flow 1 described herein in connection with FIG. 1. For example, in some embodiments, the electronic discovery management system 12, via the electronic discovery application 16, is configured to create (and/or facilitate a user to create) an electronic discovery matter, as represented by Block 2 in FIG. 1. As another example, in some embodiments, the electronic discovery management system 12, via the electronic discovery application 16, is configured to create a preservation notice and/or communicate the preservation notice to the custodian 29, as represented by Blocks 4 and 4A in FIG. 1. As still another example, in some embodiments, the electronic discovery management system 12 is configured to receive, via the enterprise network 11, an acknowledgement and/or a survey response sent by the custodian 29 from the enterprise mobile phone 20 (and/or the enterprise PC 22). As a further example, in some embodiments, the electronic discovery management system 12 is configured to collect data from one or more of the enterprise and/or custodian devices shown in FIG. 2 when and/or if those devices are placed in operative communication with the electronic discovery management system 12.

It will also be understood that some or all of the portions of the enterprise system 10 (and/or other portions of the enterprise environment illustrated in FIG. 2) may be combined into a single portion. For example, in some embodiments, the electronic discovery management system 12 and the enterprise PC 22 are the same device, such that the custodian 29 may access the combined device to perform work as an employee for the enterprise and an e-discovery manager (not shown) may access the combined device for purposes of electronic discovery. Likewise, some or all of the portions of the enterprise system 10 (and/or other portions of the enterprise environment illustrated in FIG. 2) may be separated into two or more distinct portions. For example, in some embodiments, the electronic discovery management system 12 shown in FIG. 2 is separated into a custodian management system, a case management system, and a data management system.

It will also be understood that, in some embodiments, the various portions of the enterprise system 10 (and/or other portions of the enterprise environment illustrated in FIG. 2) may be maintained by the same or separate entities. For example, in some embodiments, the network 11 is not an enterprise network 11 but is instead a public network, such as the Internet. As another example, in some embodiments, the only devices configured for use with the enterprise system 10 are enterprise devices. In addition to the embodiments specifically described above in connection with FIG. 2, it will be understood that other embodiments of the present invention may take other forms, have other configurations, and/or involve other numbers and/or types of devices and/or entities.

Referring now to FIG. 3, a mixed block and flow diagram of several devices in an enterprise system 30 is provided, in accordance with an embodiment of the present invention. As shown, the enterprise system 30 includes an enterprise PC 32, an electronic discovery management PC 34, and an enterprise mobile phone 36. It will be understood that each of the devices of the enterprise system 30 are operatively connected to each other via an enterprise network (not shown). It will also be understood that these devices may include a communication interface, a processor, and a memory, and/or may be similar to, or the same as, devices already discussed herein. Further, it will be understood that the electronic discovery management PC 34 is configured to perform functions associated with managing electronic discovery. The electronic discovery management PC 34 is also configured to distinguish between matters and cases, such that when a custodian is added to a matter, the electronic discovery management PC 34 is configured to create a preservation notice and a survey to send to the custodian. Further, when a custodian is added to a case (and/or released from a matter to a case), the electronic discovery management PC 34 is configured to collect data from one or more data storage devices to which the custodian has access.

As represented by Block 38, an e-discovery manager uses the electronic discovery management PC 34 to create a matter profile. Then, as represented by Block 40, the e-discovery manager adds a custodian profile to the matter profile. Then, as represented by Block 42, the e-discovery manager uses the electronic discovery management PC 34 to create a preservation notice and a survey, either or both of which may be based at least partially on the custodian and/or the matter. In some embodiments, the electronic discovery management PC 34 is automatically triggered to create the preservation notice and/or the survey once the matter profile is created, the custodian profile is added to the matter profile, and/or upon or after some other triggering event. As also represented by Block 42, the electronic discovery manager also uses the electronic discovery management PC 34 (e.g., via a user interface) to link the preservation notice and the survey to the custodian profile. Then, as represented by Block 44, the electronic discovery management PC 34 is configured to transmit (and/or facilitate the e-discovery manager to transmit) to the custodian an e-mail that includes a link to the preservation notice and a link to the survey.

Next, as represented by Block 46, the custodian uses the enterprise mobile phone 36 to open the e-mail and follow the link to a holds portal where the preservation notice is stored. In some embodiments, the holds portal may be private to the custodian (e.g., the custodian must use a username and/or password to access his or her holds portal) or the holds portal may be public, such that one or more other custodians may also access the holds portal. As represented by Block 48, the custodian then uses the enterprise mobile phone 36 to read the preservation notice and transmit a read receipt to the electronic discovery management PC 34 as an acknowledgement. In some embodiments, the custodian must take some action to transmit the read receipt (e.g., select a button within the preservation notice), but in other embodiments, the custodian opening and/or reading the preservation notice automatically triggers transmitting the read receipt to the electronic discovery management PC 34.

After a triggering event (e.g., receiving the read receipt/acknowledgement, upon the end of a predetermined period of time after transmitting to the custodian the e-mail having the links to the preservation notice and survey, etc.), the electronic discovery management PC 34 is configured to automatically transmit a reminder e-mail to the custodian that reminds the custodian to provide a survey response to the electronic discovery management PC 34 (and/or the e-discovery manager), as represented by Block 50. After receiving the reminder e-mail, the custodian uses the enterprise PC 32 to open the reminder e-mail and follow the link to a holds portal where the survey is stored, as represented by Block 52. In some embodiments, this holds portal is the same holds portal where the preservation notice is stored, but in other embodiments, there are one or more holds portals for storing surveys and one or more separate holds portals for storing preservation notices. Then, as represented by Block 54, the custodian uses the enterprise PC 32 to read the survey and to provide a survey response that is automatically transmitted to the electronic discovery management PC 34. It will be understood that the survey in this embodiment may be a fillable survey and that the survey may include functionality to automatically transmit the survey, once a response is provided, back to the electronic discovery management PC 34. However, in other embodiments, the custodian must take some action (e.g., select a button embedded in the survey) to transmit the fillable survey having the survey response back to the electronic discovery management PC 34.

After receiving the survey response, the electronic discovery management PC 34 is configured to release the custodian from the matter to the case and collect data from devices accessible to the custodian, including, for example, any and/or all of the devices identified in the custodian's survey response, as represented by Block 56. It will be understood that this step/event/act is described in more detail herein in connection with FIGS. 4-12.

It will also be understood that the embodiment illustrated in FIG. 3 and described herein represents a more-detailed embodiment of the present invention and that other embodiments of the present invention may vary. For example, in some embodiments, the electronic discovery management PC 34 is configured to automatically execute some or all of the steps, events, and/or acts represented by Blocks 38-44, 50, and 56, instead of, or in addition to, the e-discovery manager.

As another example, some embodiments of the present invention may include more, fewer, and/or different types of devices, custodians, and/or networks than those shown or described in connection with FIG. 3. For example, in some embodiments, the custodian performs the events represented by Blocks 46, 48, 52, and/or 54 on one or more custodian devices instead of on the enterprise devices.

In addition, it will be understood that the order, the number, and/or the content of the events described in FIG. 3 may be different in other embodiments. For example, in some embodiments, the electronic discovery management PC 34 is configured to collect data after the custodian communicates the survey response to the electronic discovery management PC 34 and before the custodian sends the electronic discovery management PC 34 an acknowledgement. As another example, in some embodiments, the custodian does not receive a survey (or a reminder e-mail prompting the custodian to provide a survey response) until after the custodian has been released from the matter to the case and/or until after an evidence request has been submitted to the electronic discovery management PC 34 from, for example, an electronic discovery team.

Further, it will be understood that the enterprise system 30 and/or the electronic discovery management PC 34 may include and/or implement any and/or all of the embodiments of the system having the process flow 1 described in connection with FIG. 1, any and/or all of the embodiments of the enterprise system 10 and/or electronic discovery management system 12 described in connection with FIG. 2, and/or any and/or all of the other embodiments described and/or contemplated herein. It will also be understood that any of the steps/events/acts illustrated and/or discussed in connection with the system 30 and/or FIG. 3 may, where possible, be implemented by any of the other embodiments of the present invention described and/or contemplated herein.

Electronic Discovery System

FIG. 4 illustrates an exemplary electronic discovery system 100 in accordance with an embodiment of the invention. In some embodiments, the environment of the electronic discovery system 100 is the information technology platform of an enterprise, for example a national or multi-national corporation, and includes a multitude of servers, machines, and network storage devices in communication with one another over a communication network. In particular, an electronic discovery management server 110, at least one database server 120, a collections server 130, enterprise personal computers 140, enterprise file servers 150, including at least one personal network storage area and at least one shared network storage area, enterprise e-mail servers 160, a conversion services server 170, a short-term staging drive 180, and a long-term network storage network 190 are all in communication over a communication network 102. The communication network 102 may be a wide area network, including the Internet, a local area network or intranet, a wireless network, or the like.

As shown in the block diagram of FIG. 5, the electronic discovery management server 110 provides user interface management for via user interface 118. In some embodiments, the electronic discovery management server 110 is a web server that can be accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 4, the electronic discovery management server 110 is in communication with the database server 120 and the collections server 130 via the communication network 102. The database server 120, as shown in the block diagram of FIG. 6, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server and the ongoing collections data 126 could be stored in another database server.

Regardless of the number of database servers employed, it is an object of embodiments of the present invention that data relating to custodians and cases be stored in the database server 120 independently. While custodian data in the Unified Directory 122 and case data in the case database 124 may be linked or correlated within the database server 120, for example, when custodians are assigned to particular cases, custodians may be managed separately from cases. Therefore, when a case is initialized and a custodian is assigned to the case, information for that custodian (such as data storage locations for that custodian) is accessed by the electronic discovery management server 110 in the Unified Directory 122 in the database server 120 and linked to the particular case, rather than manually input by the e-discovery manager into the case.

Furthermore, in addition to separating (but allowing linkage of) custodian management and case management processes, and as discussed further below, data management processes relating to the collection of data from custodian storage locations during electronic discovery are also separated from case management and custodian management processes. In this regard, the data collected from a particular custodian is stored separately from both the custodian information and any relevant case information (as discussed below, it is stored in long-term network storage network 190), but is linked to a custodian, which is in turn linked to one or more cases. This is advantageous because in the event a particular custodian is assigned to multiple cases, data collected from the custodian may be shared with the other case(s) to which the custodian is assigned. Therefore, the various processes and components of the electronic discovery system 100 may be categorized within one of case management, custodian management, or data management. And even though cases, custodians, and collected data may all be managed separately, there are necessarily links between the various datastores to allow management of the overall electronic discovery process.

Custodian

With regard to custodian management, according to some embodiments of the present invention, the Unified Directory/custodian database 122 houses information relating to all potential custodians within the enterprise and the locations where those custodians store data. The information stored in the Unified Directory 122 may include for a particular custodian, for example, the custodian's name, position, human resources identifier (a unique number for each employee of the enterprise), employment location, domain, e-mail addresses, network user identification, personal computer(s) name, paths of network storage devices used by the custodian, including Shared Drives and HomeSpaces, work history, related persons (such as managers, team members or subordinates), and any other information that may be relevant to the discovery process. Since the human resources identifier is always unique for each custodian, in some embodiments, the Unified Directory 122 may be organized around the human resources identifier. All of the information relating to how the Unified Directory 122 is generated is a multi-step process that utilizes multiple tools and methods of identifying relevant information.

For example, the electronic discovery management server 110 or the database server 120 may interface with the computer databases of the human resources computer systems of the enterprise to copy the information from the human resources databases into the Unified Directory 122. In some embodiments, the electronic discovery management server 110 may also reach out to a network directory, such as Windows Active Directory, to identify network resources related to particular custodians and integrate this information into the custodian entries including the copied human resources information. Information for the Unified Directory 122 may also be obtained from the managers of the information technology network, i.e., those individuals responsible for setting up e-mail accounts for custodians and managing the various file servers of the enterprise. Furthermore, in addition to retrieving information in the manners described above, in some embodiments, information in the Unified Directory 122 is generated through tools initialized and/or deployed by the electronic discovery management server 110. In particular, in some embodiments, as shown in FIG. 5, a profile scanning tool 112, and a mapping tool 114 are provided.

The profile scanning tool 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning tool 112 may be run on the electronic discovery management server 110, the collection server 130, or another server in the communication network 102. In some embodiments, the profile scanning tool 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications. The database server 120 may also record in each custodian's entry in the Unified Directory 122 the last time the computer was accessed by the custodian, according to the profile information transmitted by the profile scanning tool 112. Thus, the profile scanning tool 112 ultimately generates a list of personal computers used by each custodian, and this list may be presented to the e-discovery manager when a collection of a custodian's local machine(s) is initialized, as discussed in detail below.

In accordance with some embodiments of the invention, the mapping tool 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping tool 114 may be run on the electronic discovery management server 110, the collection server 130, or another server in the communication network 102. In some embodiments, the mapping tool 114 is a Windows service that is scheduled to execute through use of Windows Scheduled Task. As the mapping tool 114 crawls the communication network 102, it is configured to examine each file server and transmit to the database server 120 the path of any network storage area within the plurality of servers 134 that it positively identifies as a HomeSpace. In some embodiments, the mapping tool 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping tool 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping tool 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping tool 114 may explore the directories of each server within the plurality of servers, evaluate each path in turn, and make a determination as to whether or not the path includes a user identification.

If it is determined that the path includes the designated indicator, for example, a user identification, the mapping tool 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification. In some embodiments, the mapping tool 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping tool 114 is configured to recognize when multiple paths map to the same network storage area. The collection server 130 compares paths for the same user to determine if duplicative entries exist. This advantageously enables avoidance of multiple collections of the same data. Thus, the profile scanning tool 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning tool 112 and the mapping tool 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection tool 132 executed on collection server 130 (shown in the block diagram of FIG. 7) deployed to the particular user's machine (as discussed in detail below), and/or by utilizing a file browsing tool 116 executed on electronic discovery manager server 110 (as shown in FIG. 5).

According to some embodiments of the present invention, the file browsing tool 116 is configured to be utilized by the e-discovery manager through the user interface 118. The file browsing tool 116 gives the e-discovery manager elevated authority within the communication network 102 to access, in a limited manner, the enterprise file servers 150 within the communication network 102. While the file browsing tool 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, where the local collection tool 132 returned a list of the network resources that the user of that machine has used. In that event, the e-discovery manager may be aware of the particular drive referenced by the user. The e-discovery manager may then employ the file browsing tool 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user.

The retrieved paths of the Shared Drives may then be added, either manually or automatically, to the Unified Directory 122 in the database server 120. Thus, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection. This is advantageous as it allows a completely automated investigation/collection process, rather than relying on the e-discovery manager to manually input the targeted machines and file servers at the time of collection.

It should be noted that the Unified Directory 122 may be regularly or continuously updated as new information is gathered using the tools described herein. More particularly, the electronic discovery management server 110 may be configured to automatically retrieve data from the human resources databases and Active Directory and any other relevant sources, such as information technology directories or lists, as well as deploy the profile scanning tool 112 and the mapping tool 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources change. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has changed, the database server 120 is configured to store in the Unified Directory 122 the new data and any relevant metadata, including, for example, the time and date of the change, as well as maintain a record of the old data so that it is still a part of the custodian's profile in the Unified Directory 122. For example, in the event the profile scanning tool 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes a change as to employment status of a particular custodian, the electronic discovery management server 110 is configured to recognize the change and possibly perform particular functions in response. More specifically, in the event it is recorded in the Unified Directory 122 that the employment status of a particular custodian changes from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing a change in employment status.

Case

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an e-mail address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter. According to some embodiments, "adding" a custodian to a case or matter involves linking correlating the custodian profile in the Unified Directory 122 to the case or matter in the Case database 124.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular triggering event, such as a custodian being added to the case, or the e-discovery manager may manually cause the preservation notices and surveys to be transmitted. In some embodiments, the electronic discovery management server 110 is configured to transmit the preservation notices and surveys via a standard e-mail function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entity with access to the case and case management tools of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard e-mail functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, e-mail accounts, and network storage areas, including HomeSpaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection tool 132 running on collections server 130 (as shown in FIG. 7).

The local collection tool 132 is configured to be deployed from the collections server 130 or another server within the network 102 to any of the enterprise personal computers 140. Therefore, for a particular custodian, the local collection tool 132 is configured to utilize the machine identifying information supplied by the electronic discovery management server 110 to be deployed to the identified custodian computer. According to one embodiment, the local collection tool 132 is configured to be automatically installed on the target custodian's personal computer. The local collection tool 132 is further configured to generate a snapshot of the data residing on the local storage of the personal computer 140, for example, by using a commercially available tool such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection tool 132 advantageously allows the custodian to continue to use her machine without substantial interference from the local collection tool 132 and even interact with the data stored on the hard drive as the snapshot of the data is being transmitted to the collections server 130.

In addition to the functions described above, the local collection tool 132 may also be configured to transmit to the database server 120 a catalog of the files included in the snapshot to be stored in the ongoing collections database. This catalog may be referenced by the collections server 130 in order to determine whether collection is complete and to resume interrupted collections at the point of interruption. Additionally, in accordance with some embodiments, the local collection tool 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection tool 132 is configured to compress, hash, and upload the files included in the snapshot to the collections server 130.

In some embodiments, the electronic discovery management server 110 may utilize a computer watching tool 117 to determine when to attempt a collection from a custodian's machine. The computer watching tool 117 is configured to monitor the network 102 and determine which of the enterprise personal computers 140 are online. Therefore, in the event there is a custodian whose local machine needs to be collected, the computer watching tool 117 is configured to determine when that machine joins the network 102 (i.e., when it appears to the computer watching tool 117) and inform the electronic discovery management server 110 that it should initialize the local collection tool 132 immediately.

If a custodian profile (for a custodian released for collection) includes any paths for HomeSpaces or Shared Drives, then the electronic discovery management server 110 may undertake to collect the files from these file servers by initializing the file server collection tool 134 running on collection server 130 (as shown in FIG. 7). The file server collection tool 134 is configured to access the file server located at the given path, whether the file server is a HomeSpace or a Shared Drive, copy the data residing on the file server, and compress, hash, and transmit the copied data to the collections server 130. The file server collection tool 134 may be programmed with preset instructions that allow it to only copy files meeting certain criteria, for example, files that have certain file extensions. Alternatively, the programmed instructions may prevent the file server collection tool 134 from copying files having certain file extensions or other attributes. Either of the foregoing is advantageous if the e-discovery manager is not interested in copying executable files or source code, for example. In some embodiments, the file server collection tool 134 is also configured to generate a size estimate of the files residing on the targeted file server. In one embodiment, the file server collection tool 134 may automatically begin the collection process (copying and transmitting data) if the size estimate falls below a predetermined threshold. In addition, in some embodiments, the file server collection tool 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection tool 134 copies all or a portion of the files residing on a file server located at the path given in the released custodian's profile and transmits them to the collections server 130.

If a custodian profile (for a custodian released for collection) includes an e-mail address for an e-mail account on the enterprise e-mail server 160, then the electronic discovery management server 110 may undertake to collect the files from the enterprise e-mail server 160 by initializing the active e-mail collection tool 136 running on collections server 130 (as shown in FIG. 7). In some embodiments, the active e-mail collection tool 136 is configured to access a particular server within the enterprise e-mail server 160 on which the custodian's account resides (which is known based on the information included in the Unified Directory 122), copy all e-mail located there, including e-mails deleted by the custodian up to a predetermined period of time prior to the collection, (for example, seven days prior to the collection) and transmit the copied e-mails to the collections server 130.

Regardless of the storage resource location from which data is being collected, or the particular type of data being collected, the collections server 130 is configured to store the data first (while the collection is still ongoing) in the short-term staging drive 180 until the particular collection is complete, attach a barcode to the set of data resulting from the particular collection, and then copy the data set to the long-term storage area network 190 for permanent storage. Furthermore, the collections server 130 transmits the barcode information to the electronic discovery management server 110 to be stored in the database server 120, for example, in the custodian's profile in the Unified Database 122, in relation to the stored information about the particular collection, whether it was a local collection, an active e-mail collection, a file server collection, etc. Therefore, the barcode can be used for reference at a later date to determine the origin of the data. After the data has been copied to the long-term storage area network 190, the collections server 130 compares the hashing of the data in permanent storage to the original data in the staging drive 180 and, if the hashing is identical, purges the data from the staging drive 180.

Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 8, a block diagram is provided that illustrates the electronic discovery management structure of the present invention, according to some embodiments. As illustrated in FIG. 8, certain processes described herein may be categorized within one of case management, as represented by Block 200, custodian management, as represented by Block 220, or data management, as represented by Block 240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation tool to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 8 include those processes involving management of custodians within the scope of a case or matter. In that regard, the first process of custodian management included in FIG. 8 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery server 110 uses the contact information in the custodian's profile in the Unified Directory 122 to transmit the preservation notice(s) and survey(s) stored in the case profile to the custodian. In some embodiments, a standard e-mail function is used, so that the only information needed from the Unified Directory 122 is the custodian's e-mail address. When the custodian checks her e-mail, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's e-mail, and any other areas, as are described herein. All of the data in the various storage areas is copied and transmitted to the collections server 130, as described in detail for each particular collection tool or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 9, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using e-mail. As shown in Block 316, a reminder notice module may be employed. As shown in Block 318, the reminder notice module transmits periodic reminder notices to custodians. The notices may be sent over e-mail and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection tools to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 10, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, e-mail address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-contact list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-contact list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection tools are initialized by the electronic discovery management server 110 for collection of the custodian's data, as shown in Block 428. On the other hand, if it is a matter, then preservation notices are required. Therefore, as shown in Block 410, a preservation notice is sent via e-mail to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection tools are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 11 and 12, flow diagrams are presented of a method 500 for harvest data from various data sources, in accordance with embodiments of the present invention. At Event 502, the collection of data ensues and, at Event 504, the type of data is identified. Data Block 506 signifies active e-mail that is collected from an exchange system or the like. At Event 508 the automated active e-mail collection tool is implemented to collect e-mail from identified e-mail address. As previously noted, and in accordance with present embodiments of the invention, if a custodian profile (for a custodian released for collection) includes an e-mail address for an e-mail account on the enterprise e-mail server (160), then the electronic discovery management server (110) may undertake to collect the files from the enterprise e-mail server (160) by initializing the active e-mail collection tool (136) running on collections server (130). In some embodiments, the active e-mail collection tool (136) is configured to access a particular server within the enterprise e-mail server 160 on which the custodian's account resides (which is known based on the information included in the Unified Directory 122), copy all e-mail located there, including e-mails deleted up to a designated prior period, for example, seven days prior to the collection, and transmit the copied e-mails to the collections server (130). The e-mail collection tool is also capable of implementing bulk requests and for collecting e-mail on a scheduled basis, such as daily. The e-mail collection tool is additionally capable of being implementing enterprise wide and requires no server identifiers or the like to collect the active e-mail. In this regard, the e-mail collection tool (136) serves to reduce security risk.

At Event 510, a barcoding tool is implemented at a staging location, such as short-term staging drive (180) to attach a barcode to the set of e-mail resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hash values of the data in permanent storage to the original data in the staging drive (180) and, if the hash values are identical, purges the data from the staging drive (180). As such, barcoding is performed without the need to execute the barcoding tool on an exchange server and, as such, no human intervention is needed in the barcode process. In accordance with embodiments of the present invention, one barcode may be assigned per data set, per custodian, per data type, and/or per event (i.e., case, matter, etc.)

At Event 512, the collected e-mail data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active e-mail data is copied to a processing drive for subsequent analysis. It should be noted that the nature of e-mail data obviates the need to perform conversion and/or decryption on the data set. At Event 516, the active e-mail data set is loaded into the analysis tool and, at Event 518, the data set is exported to the requestor/reviewer for analysis.

Data Block 520 signifies other non-exchange server based e-mail, such as e-mail accessed through a client-server, collaborative application, such as Lotus Notes® or the like. At Event 522, NSF files or any other file types associated with non-exchange server based e-mail is manually harvested from an enterprise-grade e-mail server having collaborative capabilities, such as a Lotus Domino server or the like.

At Event 522, a barcoding tool is implemented at a staging location, such as short-term staging drive (180) to attach a barcode to the set of non-exchange server e-mail resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server e-mail data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based e-mail that may be encrypted is decrypted using a decryption tool, in accordance with embodiments of the present invention. The encryption of NSF files occurs at the user level and, therefore only the user has the password necessary for decryption. The decryption tool allows for decryption of the NSF file-type data without the knowledge of the user/encrypter. The decryption tool finds ID files that exist anywhere in the enterprise system, creates a database of the ID files, associates the database with the user/encrypter and subsequently decrypts the data.

At Event 530, the non-exchange server e-mail data set is loaded into the analysis tool and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding tool is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files and the like.

At Event 544, the journaled data set is loaded into the analysis tool and, at Event 546, the journaled data set is exported to the requestor/reviewer for analysis.

Referring to FIG. 12, data block 548 signifies data from a local Personal Computer (PC), such as enterprise PC (140). At Event 550, the local collection tool (132) is implemented to collect data from designated PCs by taking a "snapshot" of the device's hard drive. According to one embodiment of the invention, the local collection tool may be autodeployed thus, obviating the need for any manual entry by the e-discovery manager or the like. In other embodiments of the invention, the local collection tool (132) may be employed to collect data from network storage.

At Event 552, the barcoding tool is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 558, the local PC files that may be encrypted are decrypted using a decryption tool, in accordance with embodiments of the present invention. The decryption tool allows for decryption of the PC files data without the knowledge of the user/encrypter. The decryption tool finds ID files that exist anywhere in the enterprise system, creates a database of the ID files, associates the database with the user/encrypter and subsequently decrypts the data.

At Event 560, the local PC data set is loaded into the analysis tool and, at Event 562, the local PC data set is exported to the requestor/reviewer for analysis.

Data block 564 signifies data from network storage, such as a shared drive or HomeSpace. At Event 566, the file server collection tool (134) is implemented to automatically collect data from shared drives and/or HomeSpace. According to one embodiment of the invention, the file server collection tool (134) may be autodeployed thus, obviating the need for any manual entry by the e-discovery manager or the like.

At Event 568, the barcoding tool is implemented at a staging location, such as short-term staging drive (180) to attach a barcode to the set of network storage data resulting from the particular collection. The barcoded data is then copied and communicated to the long-term storage area network (190)

for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 574, the network storage files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 576, the network storage data set is loaded into the analysis tool and, at Event 578, the network storage data set is exported to the requestor/reviewer for analysis.

Data block 580 signifies electronic data for forensics. At Event 582, a forensic collector tool, such as EnCase® may be executed on the devices of interest to collect data. According to one embodiment of the invention, the forensic collector tool may be automatically deployed on the device of interest without the knowledge of the device user. In accordance with another embodiment of the invention, a computer watcher tool may be implemented (not shown in FIG. 12) that watches the network to determine the addition or subtraction of computers to the network based on ID's/IP addresses returned from the network.

At Event 584, the barcoding tool is implemented at a staging location, such as short-term staging drive (180) to attach a barcode to the set of forensic data resulting from the particular collection. The barcoded data is then copied and communicated to the long-term storage area network (190) for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 590, the forensic files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 592, the forensic data set is loaded into the analysis tool and, at Event 594, the network storage data set is exported to the requestor/reviewer for analysis.

Data block 596 signifies collaborative data, such as data residing at discovery sites, for example LiveLink® or the like. At Event 598, a discovery site collector tool may be executed on the devices of interest to collect data. According to one embodiment of the invention, the discovery site collector preserves at least a portion of the discovery site database in the e-discovery database, including all files and all revisions of the files. In this regard, the discovery site collector tool queries against the database to define what files need to be retrieved, then copies those files based on the result of the query. Metadata pertaining to the files is retained in the case management system tables. In accordance with another embodiment of the invention, the discovery site collector tool collects the documents and the related metadata and uses the metadata to automatically rename the files.

At Event 600, the barcoding tool is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 606, the discovery site data set is loaded into the analysis tool and, at Event 608, the discovery site data set is exported to the requestor/reviewer for analysis.

Thus, present embodiments herein disclosed provide for improvements in electronic discovery. Embodiments herein disclosed provide for an enterprise wide e-discovery system that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for electronic discovery management, the method comprising:
   creating an electronic discovery matter;
   adding a custodian to the electronic discovery matter;
   creating, automatically upon adding the custodian to the electronic discovery matter, a preservation notice for the custodian, wherein the preservation notice is an indication to preserve data for the electronic discovery matter;

customizing the preservation notice for the custodian to an abbreviated form based on whether the custodian has previously received a preservation notice either for the electronic discovery matter or a different electronic discovery matter, wherein the customized preservation notice is abbreviated based on the custodian's familiarity with preservation notices and electronic discovery process;

communicating, via a network, the customized preservation notice to the custodian at a data storage device accessible to the custodian, wherein communicating the customized preservation notice to the custodian is triggered by the adding of the custodian to the electronic discovery matter and the creating of the preservation notice for the custodian;

receiving information associated with an acknowledgement of the customized preservation notice from the custodian;

communicating, via the network, automatically upon acknowledgement of the customized preservation notice, a customized survey to the custodian at the data storage device, wherein the survey comprises one or more questions relating to data and data storage devices which the custodian has access, wherein the customized survey is customized to the custodian based on the custodian's familiarity with surveys and the electronic discovery process;

receiving a survey response from the custodian, wherein the survey response comprises answers to one or more questions on the customized survey;

associating previously unknown data with the custodian based at least in part on the survey response from the custodian;

identifying data from devices associated with the custodian;

locating the identified data from the devices associated with the custodian; and collecting, automatically, the identified data from devices associated with the custodian for electronic discover management.

2. The method according to claim 1, wherein communicating, via the network, information associated with the customized preservation notice further comprises communicating, via the network, the customized preservation notice to the custodian at the data storage device.

3. The method according to claim 1, further comprising creating the customized survey.

4. The method according to claim 1, wherein communicating, via the network, information associated with the customized survey further comprises communicating, via the network, the customized survey to the custodian at the data storage device.

5. The method according to claim 1, further comprising creating the customized preservation notice.

6. The method according to claim 1, further comprising communicating, via the network, information associated with a reminder notice to the custodian at the data storage device, wherein the information associated with the reminder notice comprises a reminder for the custodian to acknowledge the customized preservation notice.

7. The method according to claim 1, wherein the customized preservation notice comprises information associated with a status of one or more preservation notices or one or more surveys.

8. The method according to claim 1, wherein the customized preservation notice further comprises a link to the customized preservation notice.

9. The method according to claim 1, wherein the customized preservation notice comprises functionality configured to permit the custodian to identify one or more other custodians to add to the electronic discovery matter or to receive the customized preservation notice.

10. The method according to claim 1, further comprising linking the customized preservation notice to the custodian in the electronic discovery matter, and wherein linking the customized preservation notice to the custodian further comprises automatically triggering communicating, via the network, the customized preservation notice to the custodian at the data storage device.

11. The method according to claim 1, further comprising linking the customized survey to the custodian in the electronic discovery matter, and wherein linking the customized survey to the custodian further comprises automatically triggering communicating, via the network, the customized survey to the custodian at the data storage device.

12. The method according to claim 1, further comprising communicating, via the network, the customized preservation notice to a holds portal accessible to the custodian.

13. The method according to claim 1, further comprising utilizing the information associated with the survey response to associate previously unknown data storage devices and/or data to the custodian.

14. The method according to claim 1, wherein the customized preservation notice is customized based at least partially on a familiarity of the custodian with preservation notices and/or electronic discovery processes.

15. The method according to claim 14, wherein the customized preservation notice is customized to include types of data storage devices or data that is relevant or to not include said examples based at least partially on the familiarity of the custodian with preservation notices and electronic discovery processes.

16. The method according to claim 1, wherein the customized preservation notice includes a legal hold which precludes the custodian from accessing one or more data storage devices and/or performing certain tasks.

17. The method according to claim 1, wherein the customized survey is customized based at least partially on a familiarity of the custodian with surveys and/or electronic discovery processes.

18. The method according to claim 1, wherein the customized survey is customized to the custodian such that no custodian receives the same survey.

19. An electronic discovery management system, the system comprising:

a communication interface operatively connected to a network; and a processor operatively connected to the communication interface and configured to:

create an electronic discovery matter;

add a custodian to the electronic discovery matter;

create, automatically upon adding the custodian to the electronic discovery matter, a preservation notice for the custodian, wherein the preservation notice is an indication to preserve data for the electronic discovery matter;

customize the preservation notice for the custodian to an abbreviated form based on whether the custodian has previously received a preservation notice either for the electronic discovery matter or a different electronic discovery matter, wherein the customized preservation notice is abbreviated based on the custodian's familiarity with preservation notices and electronic discovery process;

instruct the communication interface to communicate, via the network, the customized preservation notice to the custodian at a data storage device accessible to the custodian, wherein communicating the customized preservation notice to the custodian is triggered by the adding of the custodian to the electronic discovery matter and the creating of the preservation notice for the custodian;

receive information associated with an acknowledgement of the customized preservation notice from the custodian;

instruct the communication interface to communicate, via the network, automatically upon acknowledgement of the customized preservation notice a customized survey to the custodian at the data storage device, wherein the survey comprises one or more questions relating to data and data storage devices which the custodian has access, wherein the customized survey is customized to the custodian based on the custodian's familiarity with surveys and the electronic discovery process;

receive a survey response, wherein the survey response comprises answers to one or more questions on the customized survey;

associate previously unknown data with the custodian based at least in part on the survey response from the custodian;

identify data from devices associated with the custodian;

locate the identified data from the devices associated with the custodian; and collect, automatically, the identified data from devices associated with the custodian for electronic discover management.

20. The system according to claim 19, wherein the processor is further configured to create the customized survey.

21. The system according to claim 19, wherein the processor is further configured to create the customized preservation notice.

22. The system according to claim 19, wherein the processor is further configured to instruct the communication interface to communicate, via the network, information associated with a reminder notice to the custodian at the data storage device, wherein the information associated with the reminder notice comprises a reminder for the custodian to acknowledge the customized preservation notice.

23. The system according to claim 19, wherein the information associated with the customized preservation notice comprises information associated with a status of one or more preservation notices or one or more surveys.

24. The system according to claim 19, wherein the processor is configured to link the customized preservation notice to the custodian in the electronic discovery matter, and wherein linking the customized preservation notice to the custodian automatically triggers the processor to instruct the communication interface to communicate, via the network, the customized preservation notice to the custodian at the data storage device.

25. The system according to claim 19, wherein the processor is configured to link the customized survey to the custodian in the electronic discovery matter, and wherein linking the customized survey to the custodian automatically triggers the processor to instruct the communication interface to communicate, via the network, the information associated with the customized survey to the custodian at the data storage device.

26. The system according to claim 19, wherein the processor is further configured to instruct the communication interface to communicate, via the network, the customized preservation notice to a holds portal accessible to the custodian.

27. The system according to claim 19, wherein the processor is further configured to associate previously unknown data storage devices and/or data to the custodian based, at least in part, on the information associated with the survey response.

28. A computer program product comprising a non-transitory computer-readable medium having computer-executable program code portions stored therein, wherein the computer-executable program code portions comprise:

a first program code portion configured to create an electronic discovery matter;

a second program code portion configured to add a custodian to the electronic discovery matter;

a third program code portion configured to create, automatically upon adding the custodian to the electronic discovery matter, a preservation notice for the custodian, wherein the preservation notice is an indication to preserve data for the electronic discovery matter;

a forth program code portion configured to customize the preservation notice for the custodian to an abbreviated form based on whether the custodian has previously received a preservation notice either for the electronic discovery matter or a different electronic discovery matter, wherein the customized preservation notice is abbreviated based on the custodian's familiarity with preservation notices and electronic discovery process;

a fifth program code portion configured to communicate, via a network, the customized preservation notice to the custodian at a data storage device accessible to the custodian, wherein communicating the customized preservation notice to the custodian is triggered by the adding of the custodian to the electronic discovery matter and the creating of the preservation notice for the custodian;

a sixth program code portion configured to receive information associated with an acknowledgement of the customized preservation notice from the custodian;

a seventh program code portion configured to communicate, via the network, automatically upon acknowledgement of the customized preservation notice, a customized survey to the custodian at the data storage device, wherein the survey comprises one or more questions relating to data and data storage devices which the custodian has access, wherein the customized survey is customized to the custodian based on the custodian's familiarity with surveys and the electronic discovery process;

an eighth program code portion configured to receive a survey response from the custodian, wherein the survey response comprises answers to one or more questions on the customized survey;

a ninth program code portion configured to associate previously unknown data with the custodian based at least in part on the survey response from the custodian;

a tenth program code portion configured to identify data from devices associated with the custodian;

an eleventh program code portion configured to locate the identified data from the devices associated with the custodian; and a twelfth program code portion configured to collect, automatically, the identified data from devices associated with the custodian for electronic discover management.

29. The computer program product according to claim 28, further comprising a thirteenth program code portion configured to create the customized survey.

30. The computer program product according to claim 28, further comprising a thirteenth program code portion configured to create the customized preservation notice.

31. The computer program product according to claim 28, further comprising a thirteenth program code portion configured to communicate, via the network, information associated with a reminder notice to the custodian at the data storage device, wherein the information associated with the reminder notice comprises a reminder for the custodian to acknowledge the customized preservation notice.

32. The computer program product according to claim 28, wherein the information associated with the customized preservation notice comprises information associated with a status of one or more preservation notices or one or more surveys.

33. The computer program product according to claim 28, further comprising a thirteenth program code portion configured to link the customized preservation notice to the custodian in the electronic discovery matter, and wherein the sixth program code portion automatically triggers the fifth program code portion.

34. The computer program product according to claim 28, further comprising a thirteenth program code portion configured to link the customized survey to the custodian in the electronic discovery matter, and wherein the ninth program code portion automatically triggers the sixth program code portion.

35. The computer program product according to claim 28, further comprising a thirteenth program code portion configured to communicate, via the network, the customized preservation notice to a holds portal accessible to the custodian.

36. The computer program product according to claim 28, further comprising a thirteenth program code portion configured to associate previously unknown data storage devices and/or data to the custodian based, at least in part, on the information associated with the survey response.

37. A method of using an electronic discovery management system, the method comprising:
  establishing a network connection between the electronic discovery management system and a data storage device accessible to a custodian;
  creating an electronic discovery matter;
  adding a custodian to the electronic discovery matter;
  creating, automatically upon adding the custodian to the electronic discovery matter, a preservation notice for the custodian, wherein the preservation notice is an indication to preserve data for the electronic discovery matter;
  customizing the preservation notice for the custodian to an abbreviated form based on whether the custodian has previously received a preservation notice either for the electronic discovery matter or a different electronic discovery matter, wherein the customized preservation notice is abbreviated based on the custodian's familiarity with preservation notices and electronic discovery process;
  transmitting the customized preservation notice to the custodian at the data storage device, wherein communicating the customized preservation notice to the custodian is triggered by the adding of the custodian to the electronic discovery matter and the creating of the preservation notice for the custodian;
  receiving information associated with an acknowledgement of the customized preservation notice from the custodian;
  transmitting, automatically upon acknowledgement of the customized preservation notice information associated with a customized survey from the electronic discovery management system to the custodian at the data storage device, wherein the survey comprises one or more questions relating to data and data storage devices which the custodian has access, wherein the customized survey is customized to the custodian based on the custodian's familiarity with surveys and the electronic discovery process;
  receiving a survey response from the custodian, wherein the survey response comprises answers to one or more questions on the customized survey;
  associating previously unknown data with the custodian based at least in part on the survey response from the custodian;
  identifying data from devices associated with the custodian;
  locating the identified data from the devices associated with the custodian; and
  collecting, automatically, the identified data from devices associated with the custodian for electronic discover management.

38. The method according to claim 37, further comprising creating the customized survey.

39. The method according to claim 37, further comprising communicating, via the network, information associated with a reminder notice to the custodian at the data storage device, wherein the information associated with the reminder notice comprises a reminder for the custodian to provide a survey response to the customized survey.

40. The method according to claim 37, further comprising linking the customized survey to the custodian in the electronic discovery matter, and wherein linking the customized survey to the custodian further comprises automatically triggering communicating, via the network, the information associated with the customized survey to the custodian at the data storage device.

41. The method according to claim 37, further comprising communicating, via the network, the customized survey to a holds portal accessible to the custodian.

42. The method according to claim 37, further comprising utilizing the information associated with the survey response to associate previously unknown data storage devices and/or data to the custodian.

* * * * *